US012535576B1

(12) United States Patent
Decker et al.

(10) Patent No.: US 12,535,576 B1
(45) Date of Patent: Jan. 27, 2026

(54) ATMOSPHERIC OPTICAL DISTORTION CORRECTING SYSTEM AND METHOD

(71) Applicant: The Board of Regents of the Nevada System of Higher Education on Behalf of the Desert Research Institute, Reno, NV (US)

(72) Inventors: David L. Decker, Reno, NV (US); Eric Wilcox, Reno, NV (US); David McGraw, Reno, NV (US)

(73) Assignee: The Board of Regents of the Nevada System of Higher Education on Behalf of the Desert Research Institute, Reno, NV (US)

( * ) Notice: Subject to any disclaimer, the term of this patent is extended or adjusted under 35 U.S.C. 154(b) by 0 days.

(21) Appl. No.: 18/831,438

(22) Filed: Jan. 24, 2025

(51) Int. Cl.
*G01S 13/72* (2006.01)
*G01S 5/00* (2006.01)
*G01S 7/40* (2006.01)

(52) U.S. Cl.
CPC ............. *G01S 13/723* (2013.01); *G01S 5/011* (2020.05); *G01S 7/40* (2013.01)

(58) Field of Classification Search
None
See application file for complete search history.

(56) References Cited

U.S. PATENT DOCUMENTS

2009/0153396 A1* 6/2009 Ainsworth .............. G01S 19/23
342/357.62
2016/0231412 A1 8/2016 Sarno et al.

OTHER PUBLICATIONS

Henderson-Sellers, A., and McGuffie, K., 1987. A Climate Modelling Primer. New York, John Wiley & Sons, Inc., 234 p.
Ciddor, P.E., 1996. Refractive index of air: new equations for the visible and near infrared. Applied optics, 35(9), pp. 1566-1573.
Southwell, W.H., 1982. Ray tracing in gradient-index media. J. Opt. Soc. Am., 72(7), pp. 908-911.
Skolnik, 2001. 'Introduction to Radar Systems, 3rd Edition'. McGraw Hill ISBN-13: 978-0-07288128-7. See the section titled 'Atmospheric Refraction—Standard Propagation, Ch. 8.4.

(Continued)

*Primary Examiner* — Whitney Moore
(74) *Attorney, Agent, or Firm* — Holland & Hart LLP

(57) ABSTRACT

An automated electromagnetic radiation target location correction method may an automated electromagnetic radiation target location correction method comprising in combination: with a locator system, electromagnetically identifying a preliminary distal target location as being along an electromagnetic ray path through atmosphere intermediate a locator device and a distal target distal from the locator device; with an automated computing system: calculating 1 to n indices of refraction in 1 to n differing discrete portions, respectively, along the electromagnetic ray path, wherein n is an integer greater that 1; for each discrete ray path portion, computing an adjusted ray path due to an index of electromagnetic refraction associated with the discrete ray path portion; computing a modified electromagnetic ray path including each discrete ray path's associated adjusted ray path; computing the adjusted target location according to the modified electromagnetic ray path; and communicating the adjusted target location to the locator system in support of path correction by the locator system.

21 Claims, 21 Drawing Sheets

(56) References Cited

OTHER PUBLICATIONS

Skolnik, 2008. 'Radar Handbook, 3rd Edition'. McGraw Hill ISBN978-0-07-148547-0. See the section titled 'Refraction, 26.3.
Jiang Changyin and Wang Beide; Atmospheric refraction corrections of radiowave propagation for airborne and satellite-borne radars; Jun. 2001; https://link.springer.com/article/10.1007/BF02916705.
Ming Yan, et al; Correction of Atmospheric Refraction Geolocation Error for High Resolution Optical Satellite Pushbroom Images; Jun. 2016; https://www.researchgate.net/publication/303559426_Correction_of_Atmospheric_Refraction_Geolocation_Error_for_High_Resolution_Optical_Satellite_Pushbroom_Images.

\* cited by examiner

ATMOSPHERIC OPTICAL DISTORTION CORRECTING SYSTEM AND METHOD

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Briefly and in general terms, the present disclosure is directed to a system and method to determine the position of a distal object, and more particularly, to determine an exact or near-exact position of a distal object by, at least in part, accounting for one or more atmospheric factors or properties.

SOME ASPECTS OF THE BACKGROUND OF THE SPECIFICATION

Historically, atmospheric optical distortion resulted in systematic positional error in determining the location, position, or both of objects by optical observation. Systematic positional error is the difference between the actual position of a distal object and the apparent position of that object determined by optical observation methods. Referring now to FIG. 1, atmospheric optical distortion is a consequence of electromagnetic radiation refracting, or bending, between the observer and the distal object due to variations in atmospheric density between observer and distal object. Electromagnetic radiation includes light (e.g., visible, infrared, ultraviolet, etc.) and radio frequency bands, including those associated with radar.

Historically, many on-board aircraft navigation systems include GPS capability for communicating one or more of aircraft position, altitude and speed to ground-based air traffic control systems. In the event of on-board navigation system failure, or a widespread failure of GPS, air traffic control had to, or would have had to, rely on ground-based radar systems that can be subject to optical distortion. Historically, in certain applications, such as defense applications, where the aircraft or airframe of interest was not in communication with certain ground-based control systems, such as that of an adversary, then position, altitude, and speed had to be determined by other means not including on-board navigation information.

Current known flight control and targeting radar analysis methods, for example, historically assume conditions described by the U.S. Standard Atmosphere. The U.S. Standard Atmosphere is a static atmospheric model of how the pressure, temperature, density, and viscosity of the Earth's atmosphere change over a wide range of altitudes or elevations. The model, based on an existing international standard, was first published in 1958 by the U.S. Committee on Extension to the Standard Atmosphere, and was updated in 1962, 1966, and 1976. It is a synthetic construct of the vertical distribution of atmospheric temperature, pressure, and density that has been used to represent year-round global mid-latitude atmospheric conditions. The standard atmosphere approach has been a fundamental aspect of international air travel control and safety. Traditional radar sets that have utilized the Standard Atmosphere approach typically used fixed correction factors for atmospheric refraction that did not account for actual atmospheric conditions. It has long been known in the art that significant errors result from utilizing simplified atmosphere approaches such as these Standard Atmosphere models, particularly with respect to radar.

Further, optical devices that recorded bearing and azimuth from an observation point to a target aircraft or airframe during phases of a flight, such as Kineto Tracking Mount (KTM) technology, have been used to derive airframe position. Historically, combining two or more datasets from KTM positions with views of the aircraft or airframe from varying directions enabled the calculation of aircraft altitude, speed, and direction using triangulation methods.

One problem with KTM data processing methods has been that they often inadequately accounted for optical refraction in air because of over simplified representations of atmospheric properties. Furthermore, ship- and land-based radar systems traditionally assumed a simplified representation of the atmosphere. Simplification of atmospheric properties was due, at least in part, to a paucity of aloft atmospheric properties data.

Simplification of atmospheric properties has often led to unrealized errors in airframe position. Referring now to FIG. 1A, surface-based radar, KTM, or other object location detectors 105 have traditionally been used as part of a ground-based or a ship-based platform to determine the position of an aloft aircraft or airframe. Use of a standardized atmosphere typically resulted in an assumed location of a distal object 110 based on an optical ray path for uniform atmospheric conditions 115 which was in error and different from the actual distal object location 120 where the atmospheric properties were different from that assumed by the standardized atmosphere, noting the refracted ray partly due to actual atmospheric conditions 125.

Referring now to FIG. 1B, historically, a radar or other object location detector was integrated into an aloft aircraft 130. Air-to-air targeting ray paths 135, 140 and air-to-ground targeting ray paths 145, 150 are shown, where the typical standardized atmosphere approach generally resulted in ray paths 135, 145 leading to erroneous assumed distal object locations 155, 160 as compared to accurate ray paths that were historically unable to be determined but that would otherwise have led to actual distal object locations 165, 170.

Historically, the use of the standardized atmosphere for air traffic control was done for safety. As an aircraft moved through controlled air space and control was handed off from one controller to the next or from one fixed radar to the next, it was the case that each radar, controller, or country had to make the same assumptions about the atmosphere so that what the controller saw on radar was the same irrespective of controlled airspace, radar set, or country. Reliance on this arrangement was somewhat reduced by on-board aircraft 'air data computer' technology that included GPS reporting position to other aircraft and ground control. But in the event of a GPS failure, radar control was the fallback system for aircraft position determination.

An improvement in position accuracy from radar measurement was needed to enhance air travel safety. An improvement in position accuracy from radar and other optical methods was needed to enhance the performance of integrated systems for national defense and security.

At one time, vertical separation of aircraft in designated air travel routes used to be 2,000 feet before the advent of GPS. This is now typically 1,000 feet. This change enabled roughly twice as many aircraft in the same airspace. If GPS were to fail due to solar activity, conflict, or the like, the ATC would have to fall back on radar, and air travel density would likewise have to fall back by half, at great cost and loss of efficiency.

SUMMARY OF SOME ASPECTS Of THE SPECIFICATION

The applicants have therefore developed coupled spatial and temporal resolution forecast models, including high-resolution forecast models with the exemplary components and engines disclosed herein to process optical data in, for example tracking and targeting systems, to solve or reduce the problem of determining real-time optical or other electromagnetic path correction and improved distal object location and positioning determinations. In some embodiments, a more accurate representation of the atmosphere between observation location and distal object, and incorporation of those observations into the correction of the observation data for optical or other applicable ray distortion, can result in more accurate estimates of one or more of airborne distal object altitude, speed, and direction, further resulting in improved performance of location and/or targeting systems with consequent improvements in performance of systems and processes that depend on location and/or targeting systems. In some embodiments, improved performance can result in safer civilian air travel and/or more effective defense systems.

FIGS. 1A and 1B represent long existing physical phenomena, including prior art, but not the full recognition of the problem they represent and how to solve, or reduce the scope of, that problem. The applicants believe that they are the first to comprehend the latter and then work to develop a solution based on the depictions in FIGS. 1A and 1, which are original drawings of the inventors which they first developed on their own. These original Figures show how the inventors saw the target location problem in a new revelatory way to their knowledge and to that extent are not prior art to the knowledge of the applicants and are part of their novel contributions in this specification.

Examples of applications for the atmospheric optical distortion correcting system, and method include, for example, ship-to-aircraft, ground-based radar-to-aircraft, and airframe- or aircraft-based air-to-air and air-to-surface targeting systems. The reduction in systematic positional error due to atmospheric optical or other distortion can improve accuracy and effectiveness of targeting and/or tracking systems for one or more of ground-, air- and ship-based platforms. In some embodiments, atmospheric optical or other correction can be achieved by linking numerical weather forecast estimates of atmospheric properties, comprehensive measurements of atmospheric properties, or both with the atmospheric optical distortion correcting system and method that determines a corrected optical path using, for example, Snell's Law.

In some embodiments, the object location detector is a ground- or ship-based detector detecting the location of an airborne object. In other embodiments, the object location detector is an airborne detector, and the object is a ground-based object. In other embodiments, the object location detector is an airborne detector, and the object is an airborne object. In another embodiment, the object location detector is ground-based detector and the object is a ground-based object at an unknown elevation.

In some aspects, the techniques described herein relate to an automated electromagnetic radiation target location correction method including in combination: with a locator system, electromagnetically identifying a preliminary distal target location as being along an electromagnetic ray path through atmosphere intermediate a locator device and a distal target distal from the locator device; with an automated computing system: calculating 1 to n indices of refraction in 1 to n differing discrete portions, respectively, along the electromagnetic ray path, wherein n is an integer greater that 1; for each discrete ray path portion, computing an adjusted ray path due to an index of electromagnetic refraction associated with the discrete ray path portion; computing a modified electromagnetic ray path including each discrete ray path's associated adjusted ray path; computing the adjusted target location according to the modified electromagnetic ray path; and communicating the adjusted target location to the locator system in support of path correction by the locator system.

In some aspects, the techniques described herein relate to an automated electromagnetic radiation target location method wherein the calculating step calculates each index of refraction, for an associated discrete ray path portion, among a plurality of the indices of refraction from a weather model simulation for said associated discrete ray path portion.

In some aspects, the techniques described herein relate to an automated electromagnetic radiation target location method where the calculation of each index of refraction from a weather model simulation for said associated discrete ray portion is based on input of temperature, humidity, and pressure from the weather model simulation associated with said associated discrete ray path.

In some aspects, the techniques described herein relate to an automated electromagnetic radiation target location method wherein the calculation of each index of refraction is also based on a wavelength of interest as input.

In some aspects, the techniques described herein relate to an automated electromagnetic radiation target location method wherein the calculation of each index of refraction is also based on at least one other chemical or physical aspect associated with said discrete ray path as input.

In some aspects, the techniques described herein relate to an automated electromagnetic radiation target location method wherein the locator system determines electromagnetic target location based on input from multiple, spaced-apart target location locating components.

In some aspects, the techniques described herein relate to an automated electromagnetic radiation target location method wherein n exceeds 100 and computes a complete adjusted ray path in real time.

In some aspects, the techniques described herein relate to an automated electromagnetic radiation target location method wherein n exceeds 500 and computes a complete adjusted ray path in real time.

In some aspects, the techniques described herein relate to an automated electromagnetic radiation target location method wherein at least a transmitted portion the weather model simulation is received by the automated computing system and includes an atmosphere data volume inclusive of the locator device and the distal target location.

In some aspects, the techniques described herein relate to an automated electromagnetic radiation target location method wherein at least a transmitted portion the weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

In some aspects, the techniques described herein relate to an automated electromagnetic radiation target location method wherein the atmosphere data in the atmosphere data volume varies in three spatial dimensions and time.

In some aspects, the techniques described herein relate to an automated electromagnetic radiation target location method wherein the locator device is one or more of land-based, water-based, or air-based.

There are other novel features, advantages of the present specification. They will become apparent as this specification proceeds. Thus, the scope of the invention is to be determined by scope of the claims as issued and not by whether a given feature is addressed in the Background or this Summary section of this specification.

Consequently, no aspects of this specification are essential or indispensable. In many implementations, the devices, systems, and methods may be configured differently than illustrated in the figures or description herein.

For example, various functionalities provided by the illustrated modules can be combined, rearranged, added, or deleted. In some implementations, additional or different processors or modules may perform some or all of the functionalities described with reference to the example implementation described and illustrated in the figures.

BRIEF DESCRIPTION OF DRAWINGS

The inventors' preferred and other embodiments are disclosed in association with the following drawings and associated text.

In the accompanying Figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
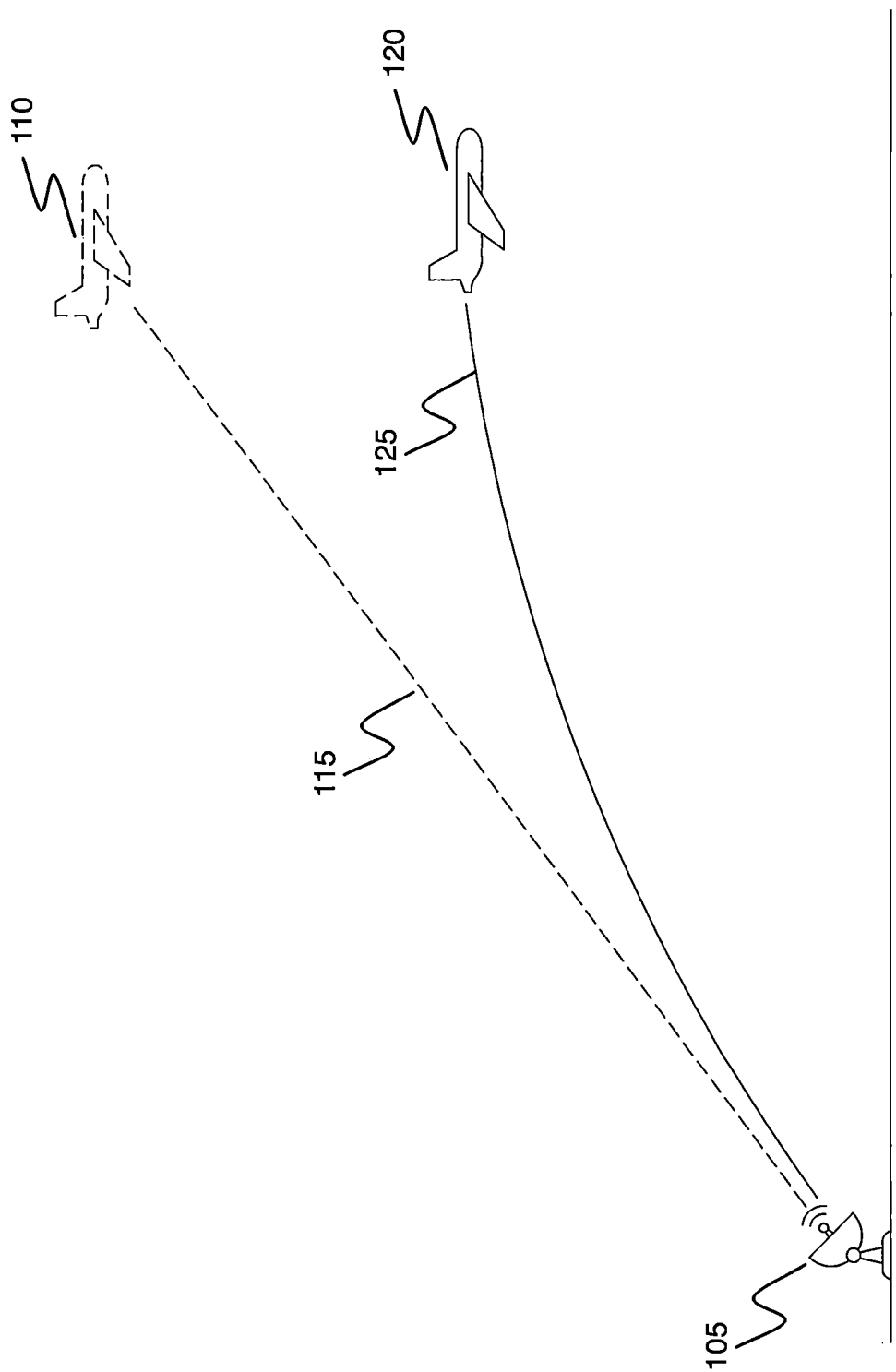
FIG. 1A and FIG. 1B are line drawings of systematic position error resulting from inadequate correction for atmospheric optical refraction between an object location detector and a distal object.
Figure 1B:
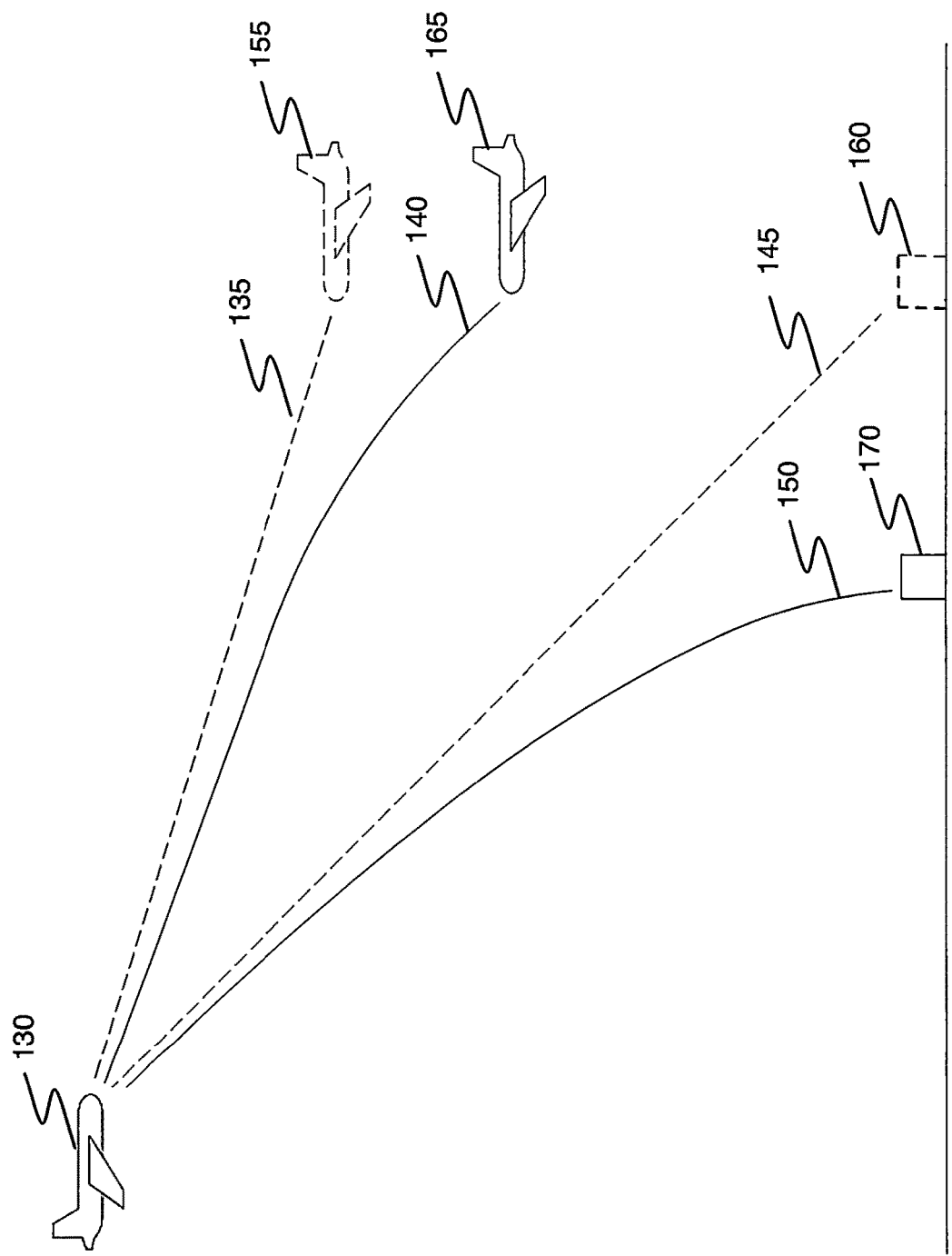

The applicant believes that it has discovered at least one or more of the problems and issues with systems and methods noted above, or their severity and importance, as well as advantages variously provided by differing embodiments of the atmospheric optical distortion correcting system and method disclosed in this specification.

The various features and advantages of the systems, devices, and methods of the technology described herein will become more fully apparent from the following description of the implementations illustrated in the accompanying Figures. These implementations are intended to illustrate the principles of this disclosure, and this disclosure should not be limited to merely the illustrated examples. The features of the illustrated implementations can be modified, combined, removed, and/or substituted as will be apparent to those of ordinary skill in the art upon consideration of the principles disclosed herein.

Light refraction occurs due to variability in air density between observer and the aircraft or airframe. Air density is a function of pressure, temperature, and water vapor concentration (humidity). Air temperature and humidity are highly variable in space and time yet are also predictable with numerical weather analysis tools.

A numerical weather forecasting model, such as, for example, the one known as the Weather Research and Forecasting (WRF) model, is a numerical representation of the fundamental conservation of mass, momentum, and energy for parcels of air in the atmosphere, as well as a range of parameterization functions to estimate the net effects of solar and terrestrial radiation, turbulence, and clouds, among other elements of the earth system that influence the weather. Such models can solve conservation equations by finite differencing the conservation equations in time and space over a three-dimensional grid that spans either the entire atmosphere, or a region of interest. When applied to a region of interest, WRF can be driven with temporally evolving boundary conditions for the lateral boundaries of the region. The boundary condition is often supplied from the output of a numerical representation of the full global atmosphere, such as a global weather forecast model or a global climate model. The output of WRF can be a 4-dimensional solution for the evolution of the weather within the domain within the boundaries of the simulation. In some embodiments, for the purposes of correcting the optical path between an observer and an object in the atmosphere being observed, this can include extracting the temporally evolving distribution of temperature and humidity in the region of the atmosphere between the observer and object to be tracked to compute the refraction of the light along the path between them.

In some instances, WRF provides output in the netCDF file format, which is a compressed binary file format with embedded metadata to document the file structure and the simulation grid structure of the resulting data.

Snell's law describes the refraction of light at the interface of two isotropic media. The deflection of light according to Snell's Law results from the passage of light through boundaries of media exhibiting different indices of refraction. The index of refraction defines the speed of propagation of light through a medium and varies according to the intrinsic properties of the medium.

Relevant here is the propagation of light through the terrestrial atmosphere. The index of refraction in the atmosphere varies primarily owing to fluctuations in the density of the air, which is determined primarily from the pressure, temperature, and humidity of the air. In some embodiments, a suitable model for computing the index of refraction for visible light (300 nm to 1700 nm wavelength) can be found through calculations taking the temperature, pressure, humidity, and wavelength of interest as input.

For example, an algorithm for computing the refractive index such as that offered in Ciddor, Philip E. "Refractive index of air: new equations for the visible and near infrared." Applied optics 35.9 (1996): 1566-1573. (hereinafter referred to as the Ciddor Algorithm) can be used to compute the index of refraction for standard air, defined therein as air at temperature 15 deg. C, pressure 101,325 Pa, and CO2 concentration 450 ppm. The algorithm can then apply a correction to the standard air index of refraction. The algorithm can take as input the desired wavelength, air temperature, air pressure, water vapor concentration, and CO2 concentration, noting that CO2 is only one of many other chemicals, chemical compositions, or physical aspect in the atmosphere that may be utilized in the calculations. In some instances, the algorithm computes the saturation vapor pressure, the molar fraction of water vapor in the air, and an enhancement factor for moist air. The index of refraction for standard air is then calculated. The molar mass of dry air for the appropriate concentration of CO2 is calculated. A first compressibility value of dry air at the temperature and pressure is calculated. A second compressibility value of pure water vapor is calculated. The two compressibility values can then be used to calculate the densities of standard air and standard water vapor. A third compressibility value of moist air at the desired temperature, pressure and molar fraction of water vapor can then be calculated. The densities of the dry and moist components of the air can be calculated using the third compressibility value. Finally, the densities can be used to calculate the desired index of refraction of the moist air.

Figure 2:
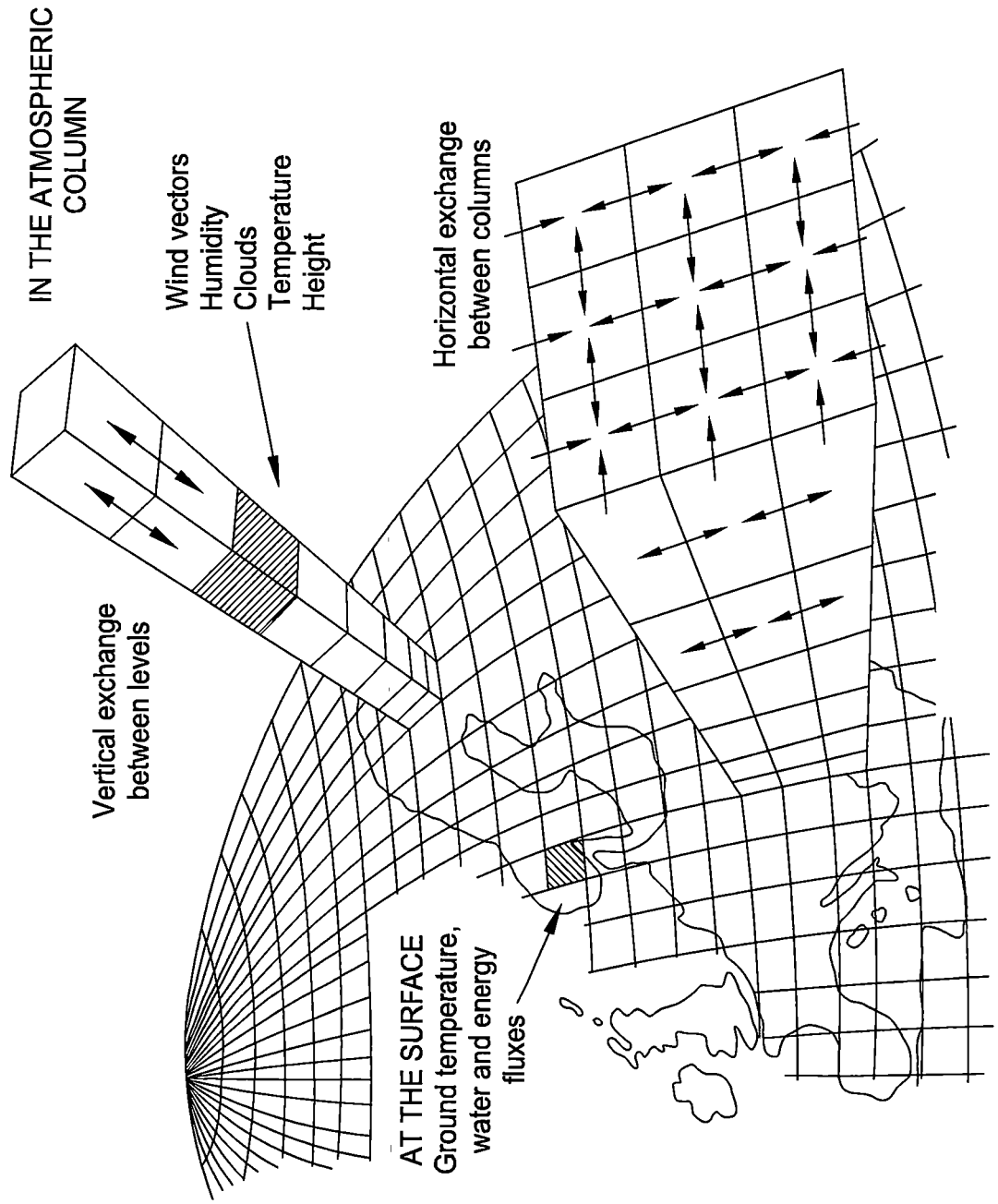
FIG. 2 is a graphical representation of a traditional numerical weather forecasting model illustrating how the atmosphere is gridded into discrete cells/blocks.

Given that the output from, as an example, the WRF atmospheric model is discrete, a solution can be constructed by, for example, applying Snell's law at the interfaces of adjacent grid boxes of the discretized atmosphere, such as depicted in FIG. 2.

Figure 3:
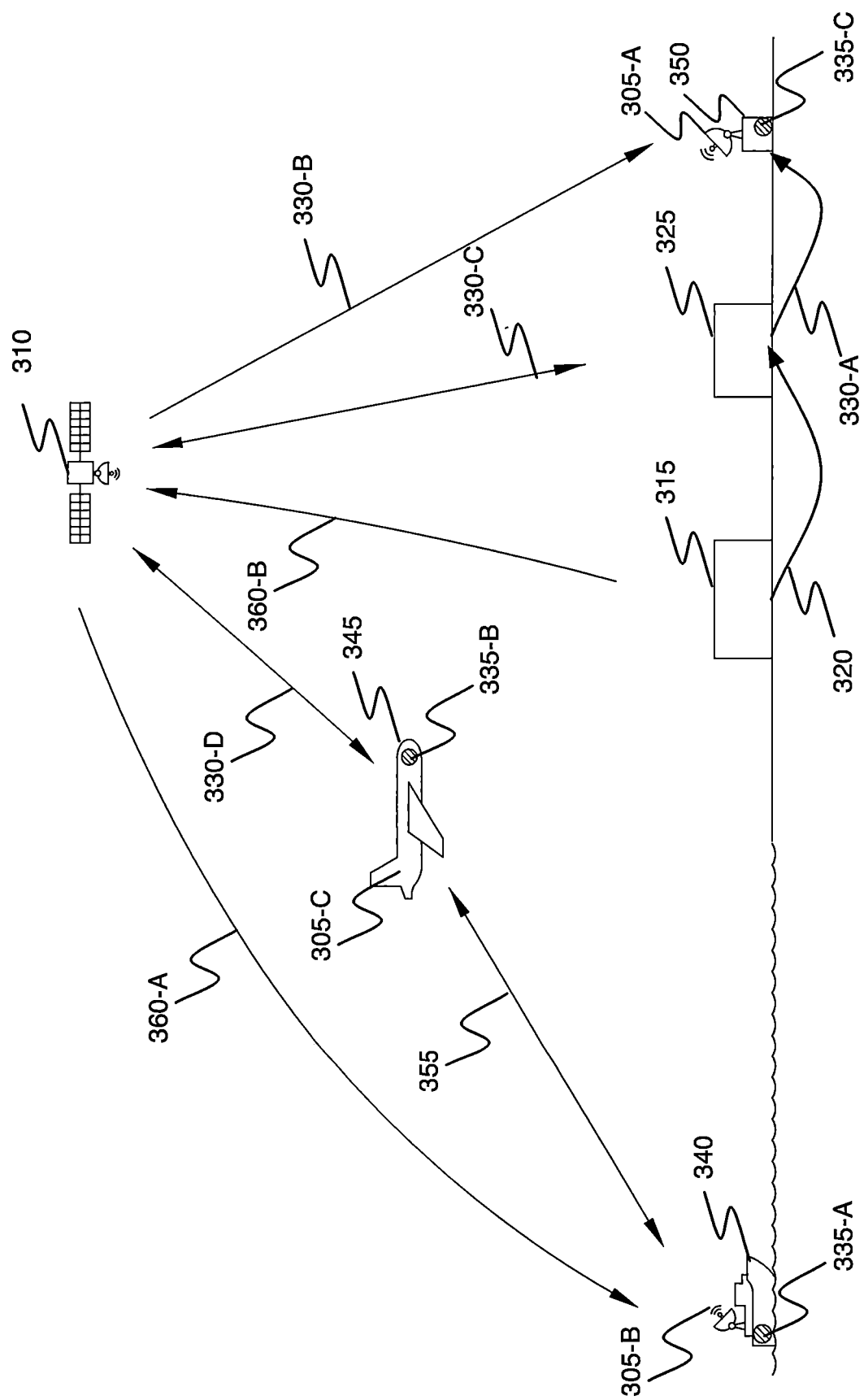
FIG. 3 is a graphical representation of an integrated atmospheric optical distortion correcting system.

Referring now to FIG. 3, in some embodiments, an atmospheric optical distortion correcting system is complimentary to, integrated with, or embedded in a larger locational system, that can include multiple observing components 305 to determine a distal object position by, for example, triangulation, which components could include one or more of optical telescopes, radar, lidar instruments, or the like. In some instances, one or more observing components are in communication with one or more satellites 310. These components can observe a distal object, which is an object whose position, velocity, or acceleration are to be determined but are initially unknown. In the volume inclusive of the object location detectors, which can be one or more of land based 305-A, water-based 305-B, or air-based 305-C and the distal object, is a representation of the temperature, pressure and humidity of the atmosphere that varies in three spatial dimensions and time, such as provided by a global numerical weather/climate forecasting system 315 coupled via a communication pathway 360 to a high-resolution down-scaled numerical weather forecasting engine 325, or the like. In some instances, the computational output from the global numerical weather/climate forecasting system 315 is transmitted to object location detectors via pathways 320, 330 for computing a real-time ray path correction via correction engines, such as embedded correction engines 335. In some embodiments, achieving real time correction includes integration with tracking and targeting systems, such as optical tracking and targeting systems, such that there is no latency or low latency, no lag or low lag, and no human action or thought involved. Correction and calculations can occur at least as fast as the targeting system emits, receives, processes, and/or displays a target indicia.

In other instances where more remote and independent operation is warranted, such as for at-sea-operations, the high-resolution down-scaled forecasting system comprising 325 is integrated with the correction system 335-A and contained aboard the vessel 340. In some instances, the remote vessel 340 may obtain connection 330 to the global forecast engine 325 twice in a given 24-hour period. In some instances, the remote vessel 340 may obtain connection 360-A to the global forecast engine 325 less than six times in a given 24-hour period. In some instances, the remote vessel 340 may obtain connection 360 to the global forecast engine 325 six or more times in a 24-hour period. In still other instances, the remote vessel 340 may obtain connection 360 to the global forecast engine 325 whenever connections are available during a 24-hour period. In some instances, such as for aircraft 345 operations, a hybrid system of high-resolution down-scaled forecasting capabilities based on land 350, sea 340, or airborne platforms 345 support real-time optical ray path correction 335 on board the aircraft 345 utilizing communications pathways from satellite 310 or ship 355.

The atmospheric optical distortion correcting system can collect one or more of the position and view geometry of the object location detectors (e.g., azimuth and elevation angle of the instruments). In some instances, the atmospheric optical distortion correcting system also collects the atmospheric property data. An index of refraction calculator can compute the spatial distribution of the index of refraction in the spaces between the object location detectors and the distal object. Ray paths can be determined between the object location detectors and the distal object that can then be corrected based on the expected refraction from the detailed distribution of the index of refraction in the volume between the object location detectors and the distal object. In some implementations, this can occur in real time, where such real time calculations and determinations occur on one or more computing devices, which can include one or more embedded computing devices, networked computer devices, embedded computing components, or the like, such as, for example, general-purpose processors, a digital signal processor, an application specific integrated circuit, a field programmable gate array, or other programmable logic device, discrete gate or transistor logic, discrete hardware components, or any combination thereof designed to perform the functions described.

Given, however, that the discretization of the atmosphere in WRF is an approximation of a continuous medium, in some embodiments, a ray-tracing method can be used to estimate light propagation in a continuous medium. Such a solution is provided by, for example, the Southwell Solution, as described herein. This approach can provide a three-dimensional gradient equation solvable in real time by a computing device with standard discretization techniques to compute the path of a ray of light through a medium with, for example, a varying or continuously varying index of refraction.

In some embodiments, output from a weather model includes the evolution of 3-dimensional fields of temperature, air pressure, and humidity at temporal scales of, for example, minutes to 10s of minutes and horizontal scales of 100s of meters to kilometers, and vertical scales of meters to 10s of meters. In some instances, the use of models allows for the capture of temporal and spatial variability of weather parameters that can be used in determining the index of refraction of air.

In some embodiments, optical distortion correction includes receiving atmospheric data, such as that included in or otherwise obtained from a weather model simulation and receiving or otherwise determining uncorrected observation data by an observer or other object location detector of a distal object from the origin location using an optical means such as, for example, a radar. Weather model simulation data can roughly correspond to the location of the origin and location of the distal object for one or more date/times of interest. A two-dimensional vertical cross section in the atmosphere can be constructed as defined by the raw uncorrected observed bearing and time of measurement between the origin and distal object locations and the air space above these. Values of the atmospheric properties can be one or more of received, determined, or otherwise extracted from the model output files in this 2-D plane. The index of refraction of the air in the 2-D vertical plane can be determined. A ray tracing calculation simulating an optical ray beginning at the observer and propagating in the direction of the distal object at an assumed or measured (e.g., radar data) height can be constructed. As the ray propagates from the observer toward the distal object, the ray bends due, at least in part, to the gradient in the index of refraction between the observer or object location detector and the distal object. In some instances, the determined difference between the elevation of the ray and the assumed elevation of the distal object is the estimated magnitude of the correction to the initial distal object location initially determined by the observer or object location detector.

In some embodiments, the system returns the difference between the raw observed elevation and the corrected elevation. In some instances, applying this approach with multiple observation locations of the distal object can enable triangulation and improved estimates of a distal object flight path and velocity. In some instances, the system provides automated correction for radar or other optical sensors.

In some embodiments, atmospheric properties are measured in near-real-time between the object location detector and the distal object, allowing for measurement-based index calculations rather than estimates of atmospheric properties from a numerical forecast. In some instances, a form of a corrected ray path can be calculated from observed azimuth and bearing to an object, such as an airframe, where the position of the airframe is known by other means.

In some embodiments, profiles of one or more of pressure, temperature, and humidity that exist between the object location detector and the object are extracted or otherwise determined, such as from WRF model data or other weather reconstruction or forecast model output. The model output can be taken at its native resolution or interpolated to a higher spatial resolution to, for example, better approximate a continuous medium. In some instances, a plane can be defined between the object location detector and the object with one horizontal and one vertical dimension. The spatial orientation of this plane can then serve as an input into a computing process that constructs the 2-D distribution of the refractive index for visible wavelengths using, for example, the Ciddor Algorithm.

Figure 4:
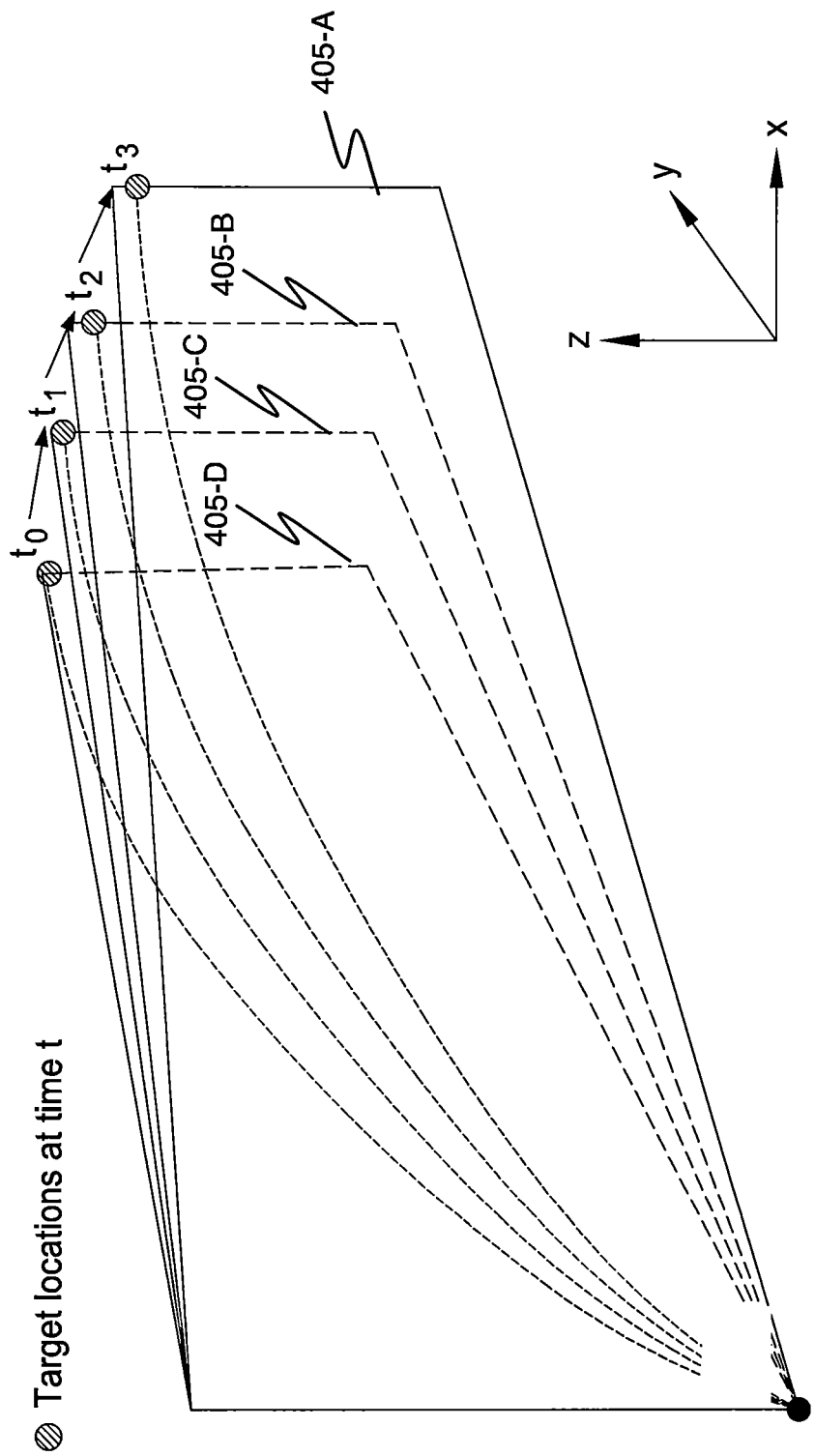
FIG. 4 is a graphical representation of refraction in two dimensions computed over small increments in time as an object moves through the atmosphere.

Referring now to FIG. 4, in some implementations, new 2-D planes of refractive index 405 are calculated by a computing device during the incremental progression of the object through the volume over time. Each 2-D plane of refractive index values can then be used by a computing device to estimate potential errors in determining the location of the object based on optical observation as it proceeds along its trajectory through the volume of air.

Figure 5:
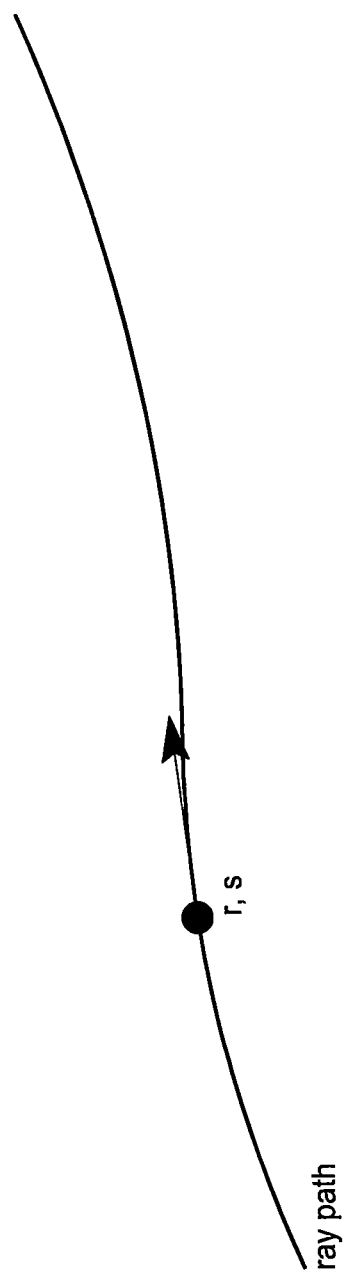
FIG. 5 is a drawing of a ray path calculated as the ray passes through a continuous gradient in refractive index.

Referring now to FIG. 5, offered in Southwell, W. H. "Ray tracing in gradient-index media." JOSA 72.7 (1982): 908-911 (hereinafter referred to as the Southwell Solution), an equation for a ray-tracing solution for light propagation through a heterogeneous medium with a varying index of refraction, such as the atmosphere with varying temperature, humidity and density of air, which is derived from the first principles of electromagnetic radiation, is:

$$\frac{d}{ds}\left(n\frac{dr}{ds}\right) = \nabla n$$

where r is the position of the advancing ray along the ray path, s is the direction of the ray is advancing, and n is the index of refraction.

Figure 6:
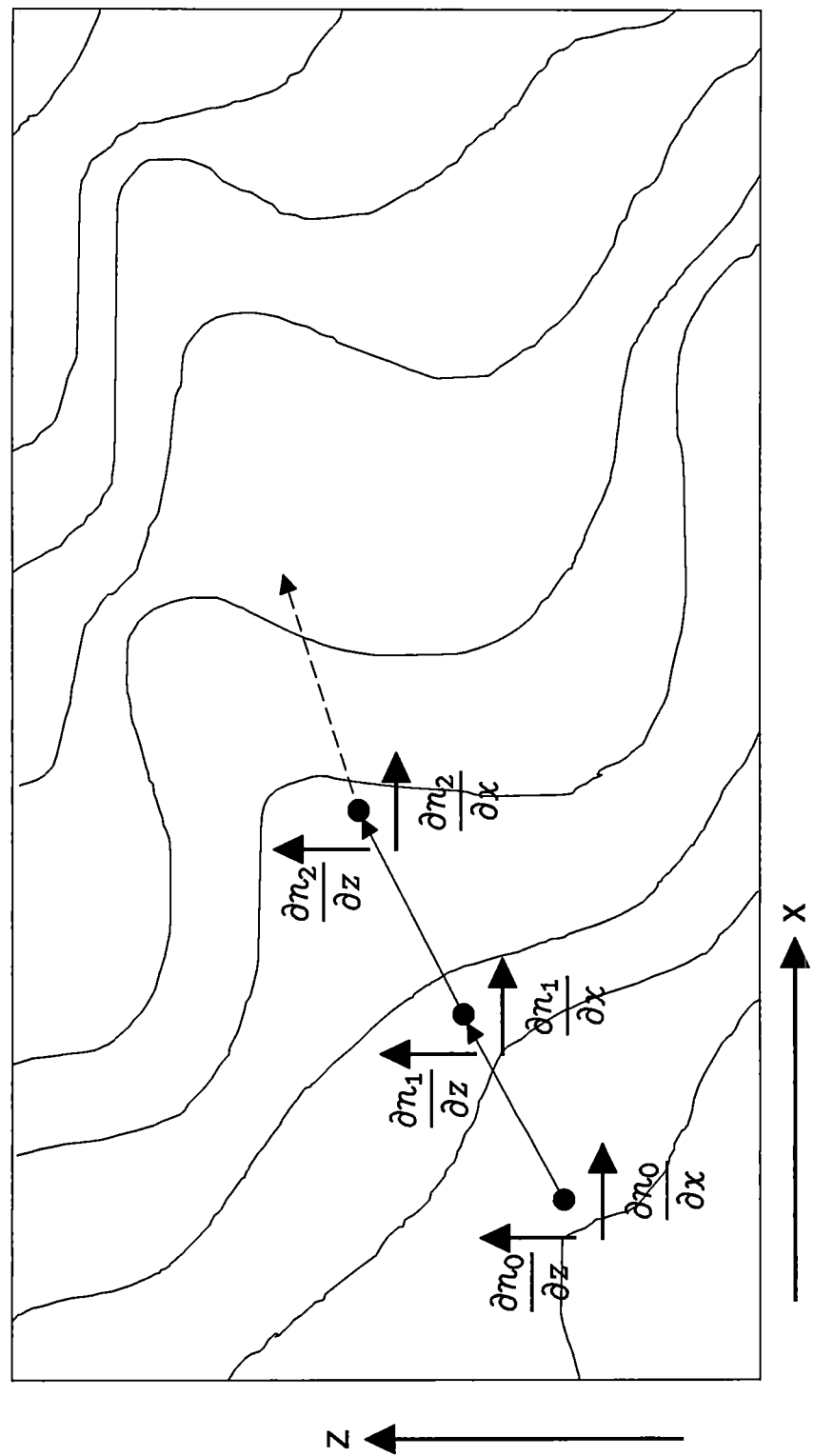
FIG. 6 is a graphical representation of the object location correction engine generating an optical ray path using a continuous refractive index field.

Referring now to FIG. 6, the ray path is determined as the ray passes through a continuous gradient in refractive index by iteratively solving for the position, r, and direction, s, of the ray in small increments along the ray path. We use the previous two incremental values of r along the path to determine the direction s of the ray, and the local gradient in n at location r to determine the next value of r for the location of the ray for a small incremental distance further down the ray path. This first-order finite differencing scheme can provide accuracy, particularly where the incremental distance of each iteration is small. In some instances, higher-order finite differencing schemes can provide increased accuracy.

This step-wise solution to this differential equation can evaluate the expected error between the true altitude of a target object observed in the atmosphere after accounting for the curvature in the ray-path of light due to gradients in the index of refraction and the altitude assumed based on the viewing angles of the observing instrument trained on the target object. In some instances, the expected error in estimating the true altitude of the target object is approximately 0.5 ft for a distal object at approximately 35,000 ft. altitude and viewed at a high elevation angle to the horizon. In other instances, the expected error in estimating the true altitude of the target object is approximately 10 ft. for a distal object at 5000 ft. altitude and viewed at a lower elevation angle to the horizon. In some embodiments, errors can vary within this range using real gradients in the index of refraction of the atmosphere derived from, for example, a state-of-the-art numerical weather forecast model constrained by real observations of the atmosphere. Variations can depend on one or more of the height of the distal object, and hence the viewing angles of the observing instrument, as well as the variations in one or more of the vertical and horizontal gradients in the index of refraction of the air due to one or more of real variations in temperature, humidity, and density of the air.

Although the solution previously described is a two-dimensional solution, the ray tracing solution applied here is a three-dimensional gradient equation that can be similarly solved in three dimensions by a computing device using output from an atmospheric model. While the two-dimensional planes of refractive index described above can be used the determine distal object location corrections based on vertical gradients of refractive index, the three-dimensional model output can also quantify horizontal gradients in index of refraction. A solution to r in the equation above can be solved for in three dimensions by including equations for the horizontal components of the deviations of r.

In some instances, model grid size, model time step size, or both can be taken into account for the generalized weather conditions that are being simulated. In some cases, reducing the coarseness of grid size, tailoring the time step size, or both can reduce model errors that can negatively impact the object location correction accuracy. In some embodiments, to address this limitation at least in part, two or more numerical forecast models can be coupled with each other. For example, in some embodiments the first model can provide 48- to 72-hour forecasts that could be used to adapt the grid domain geometry of the second model to better capture forecasted weather conditions; and the second model can provide the high-resolution in space and time day-of forecast, which in some embodiments can allow for a real-time optical distortion correction capability. Such a method can involve two (or more) numerical weather simulations running in concert or coupled with each other.

While the WRF model provides output on a rectangular latitude-longitude grid, the scheme can also solve for a ray-path within any vertically-oriented plane of FIG. 4. In some instances, interpolation of the values from the rectangular latitude-longitude grid to the values that intersect the vertical plane of interest occurs.

In some embodiments, the deflection of the ray-path between the observer and the object is determined, at least in part, by the variations in the index of refraction along the ray-path. The Ciddor Algorithm can determine the index of refraction for one or more of dry air, water vapor, and $CO_2$, and then these can be combined based on the partial density of each component, accounting for the temperature and pressure. $CO_2$ is only one of many chemicals, chemical compositions, or physical aspect in the atmosphere that may be utilized in such calculations. While the approach offered in the Ciddor Algorithm is designed to be applied for wavelengths in the visible and near-infrared part of the spectrum, the correction process of the object location correction engine can be applied to other parts of the spectrum, such as radio frequencies for radar applications, such as, by replacing the refractive index calculation with an equivalent set of equations appropriate for the desired frequencies.

In some embodiments, the object location detectors operate either passively or actively using wavelengths of the electromagnetic spectrum including one or more of radio frequencies, infrared, visible, or ultraviolet light. Passive instruments, such as optical telescopes can either detect light scattered off of the distal object, or radiation emitted directly from the distal object, as in infrared imaging systems. Active instruments, such as radar or lidar instruments, emit radiation from an antenna and observe the back scattered radiation from the distal object. In some instances, the atmospheric optical distortion correcting system and method includes object location detectors including any one or more of the object location detector principles described herein by implementing index of refraction calculators on one or more computing devices for the appropriate wavelengths of operation of the object location detectors. One or more specialized computing devices can be implemented to obtain real time calculation and determination outputs.

Figure 7:
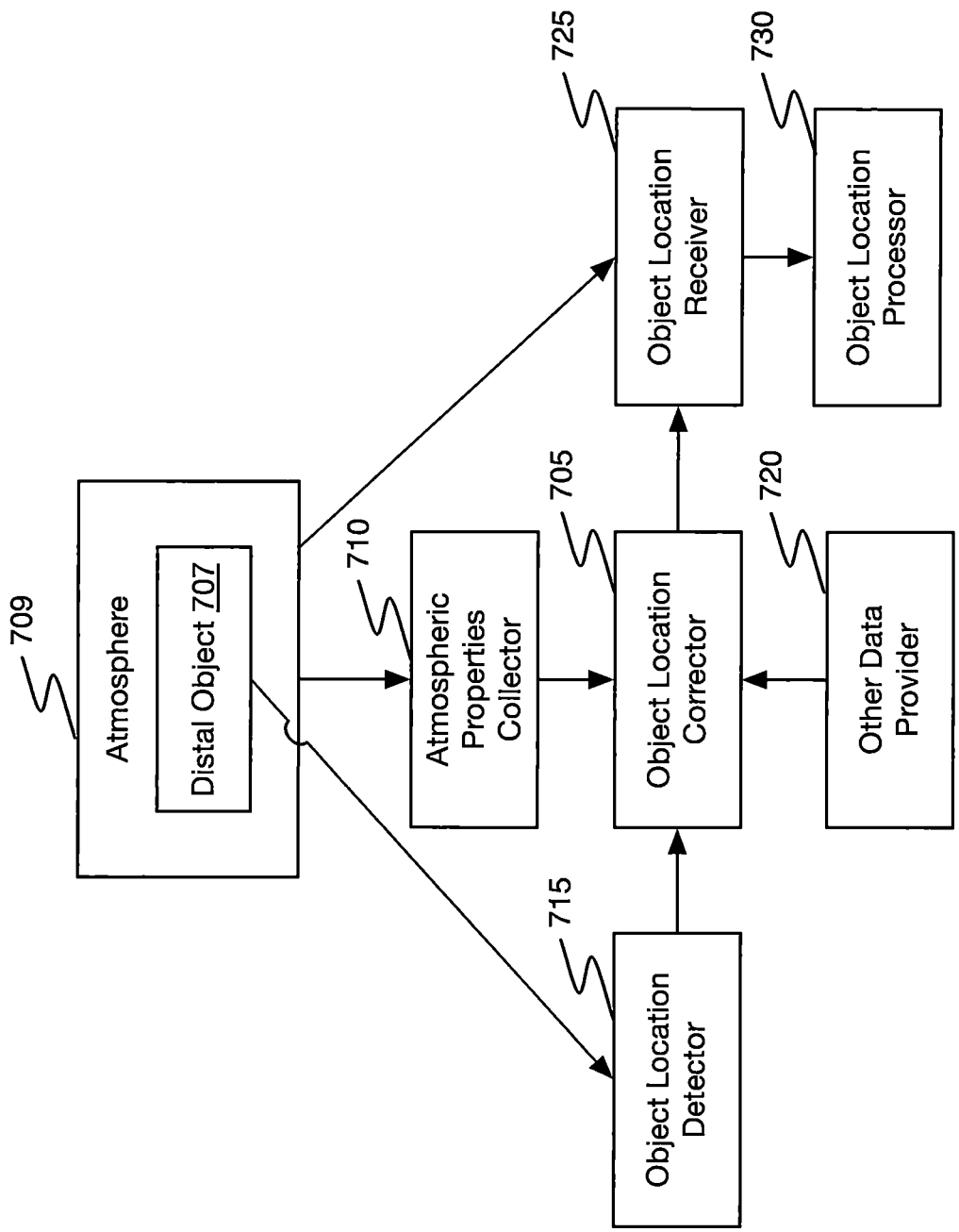
FIG. 7 is a block diagram of the atmospheric optical distortion correcting system with an object location corrector.

Referring now to FIG. 7, in some embodiments, the object location corrector 705 is a discrete component operable to detect a location of a distal object 707 located in an atmosphere 709, communicatively coupled to one or more of an atmospheric properties collector 710, an object location detector 715, other data providers 720, and an object location receiver 725 communicatively coupled to an object location processor 730.

Figure 8:
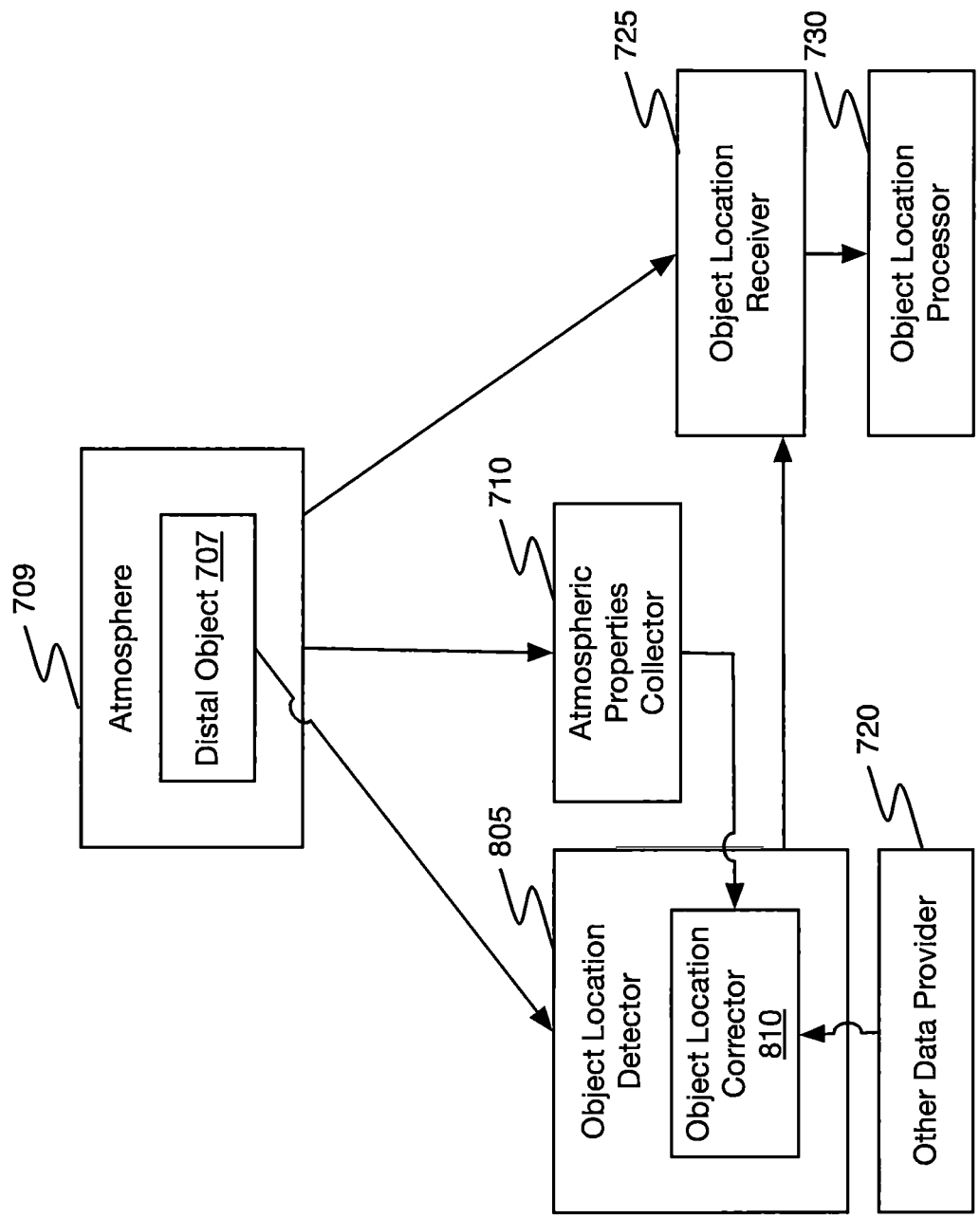
FIG. 8 is a block diagram of an atmospheric optical distortion correcting system with the object location corrector embedded with the object location detector.

Referring now to FIG. 8, in some embodiments, the object location corrector 810 is included within object location detector 805, autonomously or semi-autonomously coupling output from the atmospheric properties collector 710, performing correction determinations, and outputting object location correction factors, a corrected distal object location, or both to an object location receiver 725. In some instances, this is provided in real-time or near real time.

Figure 9:
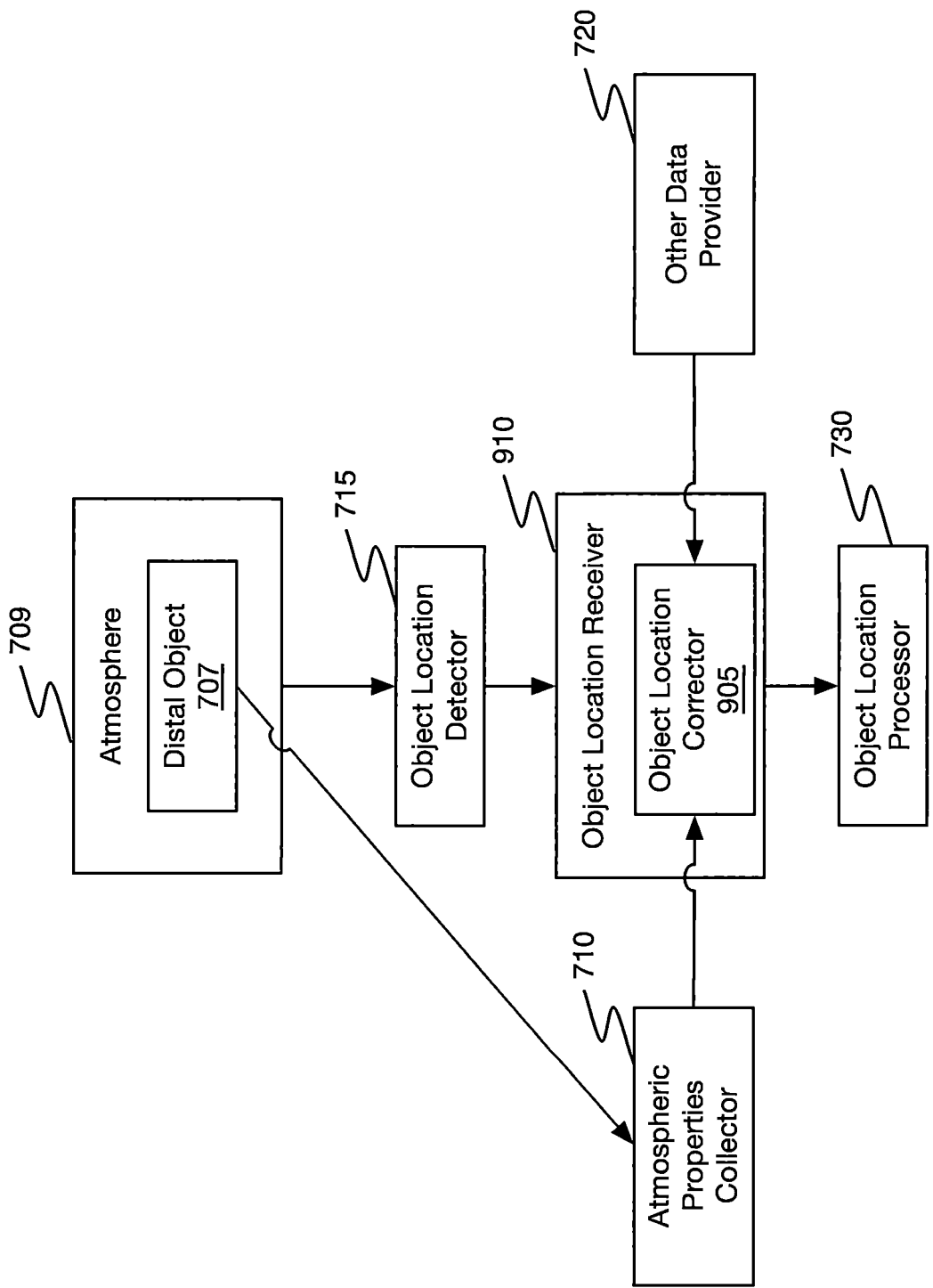
FIG. 9 is a block diagram of an atmospheric optical distortion correcting system with the object location corrector embedded with the object location receiver.

Referring now to FIG. 9, in some embodiments, the object location corrector 905 is included within the object location receiver 910, such as a radar, autonomously or semi-autonomously coupling output from an atmospheric forecast model, performing the correction determinations, and presenting or displaying to the radar operator a corrected distal object location in real-time.

Figure 10:
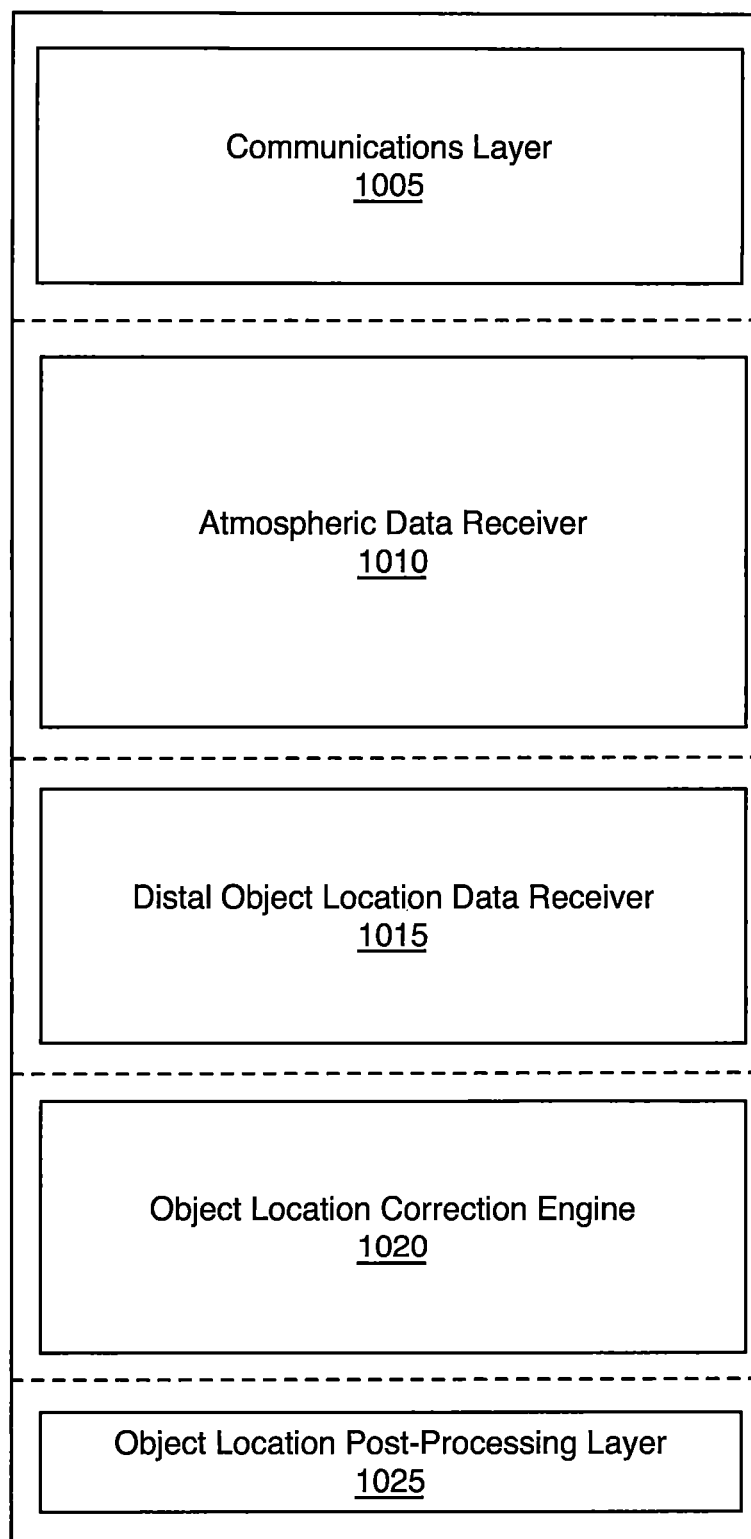
FIG. 10 is a block diagram of the services and component layers of the object location corrector of the atmospheric optical distortion correcting system of FIG. 3.
Figure 11:
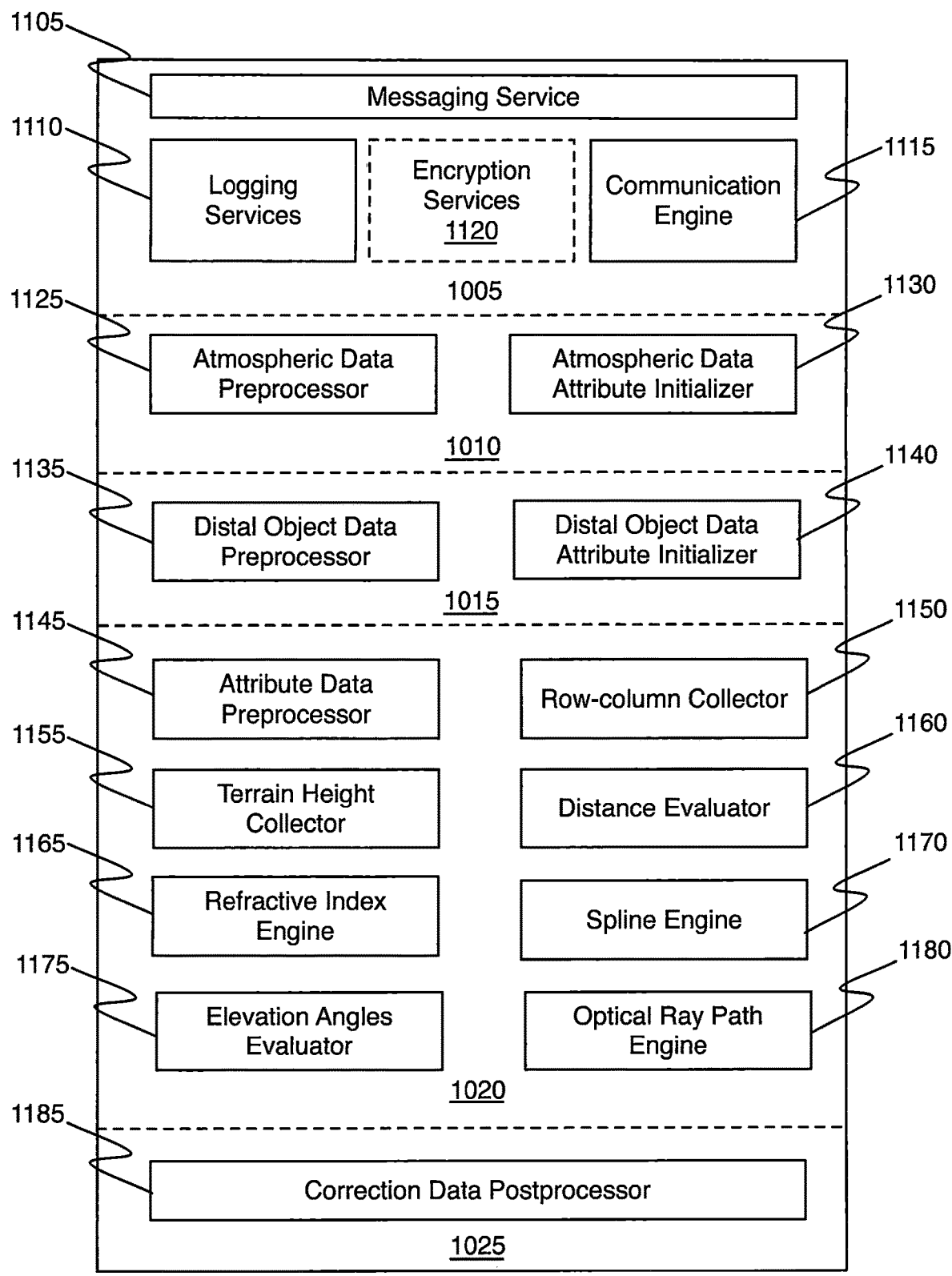
FIG. 11 is a block diagram of the various services, engines, and components of the services and component layers of FIG. 10 including performing the various operations of the object location corrector of the atmospheric optical distortion correcting system of FIG. 3.

Referring now to FIG. 10 and FIG. 11, in some embodiments, the object location corrector 1000 includes one or more engines or services performing various operations of the object location corrector of the atmospheric optical distortion correcting system 300. The communication layer 1005 can include, for example, one or more of a messaging service 1105, a logging service 1110, and a communication engine 1115. In some embodiments, encryption service 1120 are included.

In some embodiments, an atmospheric data receiver 1010 includes one or more of an atmospheric data pre-processor 1125 and an atmospheric data attribute initializer 1130.

In some embodiments, a distal object location data receiver 1015 includes one or more of a distal object location data pre-processor 1135 and a distal object location data attribute initializer 1140.

In some embodiments, an object location correction engine 1020 includes one or more of an attribute data processor 1145, a row-column collector 1150, a terrain height collector 1155, a distance evaluator 1160, a refractive index engine 1165, a spline engine 1170, an elevation angles evaluator 1175, and an optical ray path engine 1180.

In some embodiments, an object location post-processing layer 1025 includes a correction data post-processor 1185.

The atmospheric optical distortion corrector receives atmospheric model output files, such as, for example, from an atmospheric model such as the WRF model. In some implementations, an OpticalCorrector object is initialized with one or more attributes, and a set of operations are performed. In some embodiments, a calculate_refractive_index compute operation extracts a vertical cross section of meteorological quantities, such as through the use of the open source wrf-python library, and creates a corresponding cross section of refractive index, such as through the use of the ref_index.py program. A calculate_optical_raypath process then determines the corrected elevation of the ray path.

In some embodiments, the full four-dimensional solution is provided as output from WRY for the spatial and temporal variations of temperature, pressure, and humidity. These parameters can be used by a computing device to determine the index of refraction of air. In some embodiments, the atmospheric weather model can be run at resolutions at or near 10s of meters in the horizontal and meters in the vertical. In some instances, the model can be run with horizontal grid spacings of multiple kilometers. In some embodiments, the temporal resolution of the model, such as WRF, is determined by the spatial resolution associated with the numerical stability of the forward integration of the model in time. In some instances, the time step of the integration is seconds for fine grids of tens of meters. In other instances, time step of the integration is tens of seconds or minutes for grid spacings of multiple kilometers. In some implementations, the output is saved as fine as tens of seconds to minutes.

Other process can include:
- a get_rowcolumns process that identifies the row and column location in the WRF model output of the site and distal object locations based on their latitude/longitude location on the globe;
- a get_terrainheight process that gets the ground elevations of site and distal object in meters above msl from WRF model output;
- a calculate_distance process that calculates the distance (meters) between site and distal object given their latitude/longitude location; and
- a calculate_elevation_angles process that calculates the elevation angle between site and distal object.

Figure 12:
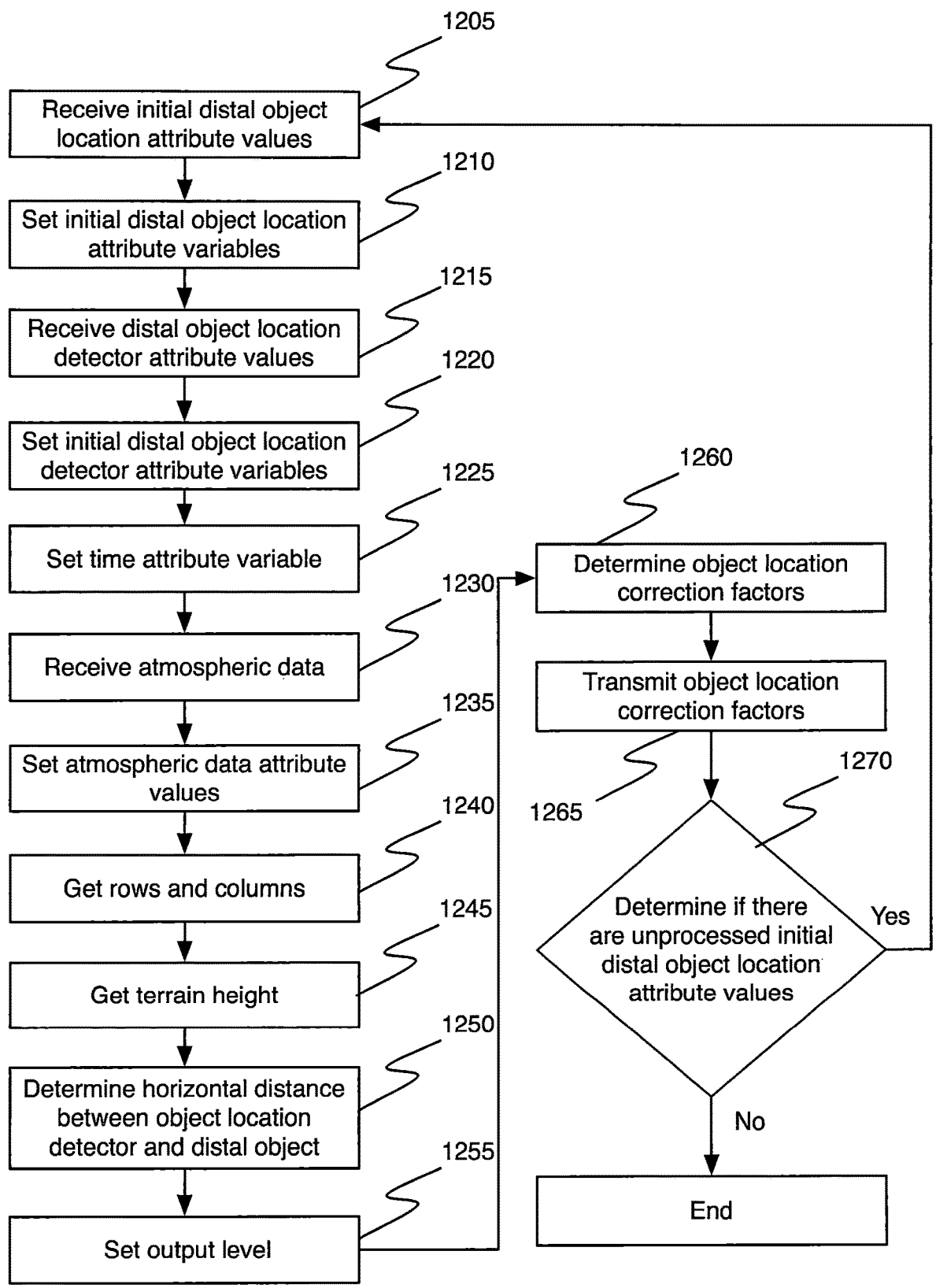
FIG. 12 is a flow diagram of the atmospheric optical distortion correcting system process.

Referring now to FIG. 12, in some embodiments, the atmospheric optical distortion correcting system and method receives, initializes, and sets one or more attributes. Initial distal object location attribute values are received 1205, such as, for example, the estimated initial latitude, longitude and altitude for the distal object. These attribute values can be obtained by, for example, an initial uncorrected measurement of distance, bearing, and azimuth of the distal object from a radar installation. Once received by a computing device, these values are used to set one or more variables 1210 such that they can be used to initialize the position correction calculation by indexing the location and altitude of the distal object to the WRF output grid. Distal object detector location attribute values are received 1215, such as, for example, the known latitude, longitude, and altitude of the detector system. Once received, one or more of these values are used to set one or more variables 1220 such that they can be used to initialize the position correction calculation by indexing the location and altitude of the detector to the WRF output and terrain elevation grids. A time attribute variable is set 1225 for purposes of, for example, matching the time of observation of the distal object by the object detector to the correct time index in the WRF output files to initialize the position correction calculation. Atmospheric data attribute values are received 1230, such as from the WRF model output based on the time and position of the detector and distal object and the atmospheric properties from the appropriate WRF model output grid blocks that intersect a straight-line vector between the detector and the distal object, then one or more of these data attribute values are used to set one or more atmospheric data attribute variables 1235. The relevant rows and columns of data from the WRF output grid are obtained 1240, such as by indexing the initial estimate of the distal target location and known location of the distal target detector and the WRF output grid. Terrain height is determined 1245, such as by indexing the initial estimate of the latitude and longitude of the distal target with a digital elevation map. The horizontal distance 1250 between the object location detector and distal object is determined based on their initial latitude and longitude position estimates. The information given above is then combined to set an output level that provides an estimated corrected altitude of the distal target based on the correction due to refraction 1255.

This information is provided to the object location correction engine which determines object location correction factors 1260. Once one or more object location factors are determined, one or more object location correction factors are transmitted 1265 to an object location receiver 725, 910 and object location processor 730. If there are additional unprocessed distal object location attribute values, the process is repeated for such additional values 1270.

Figure 13:
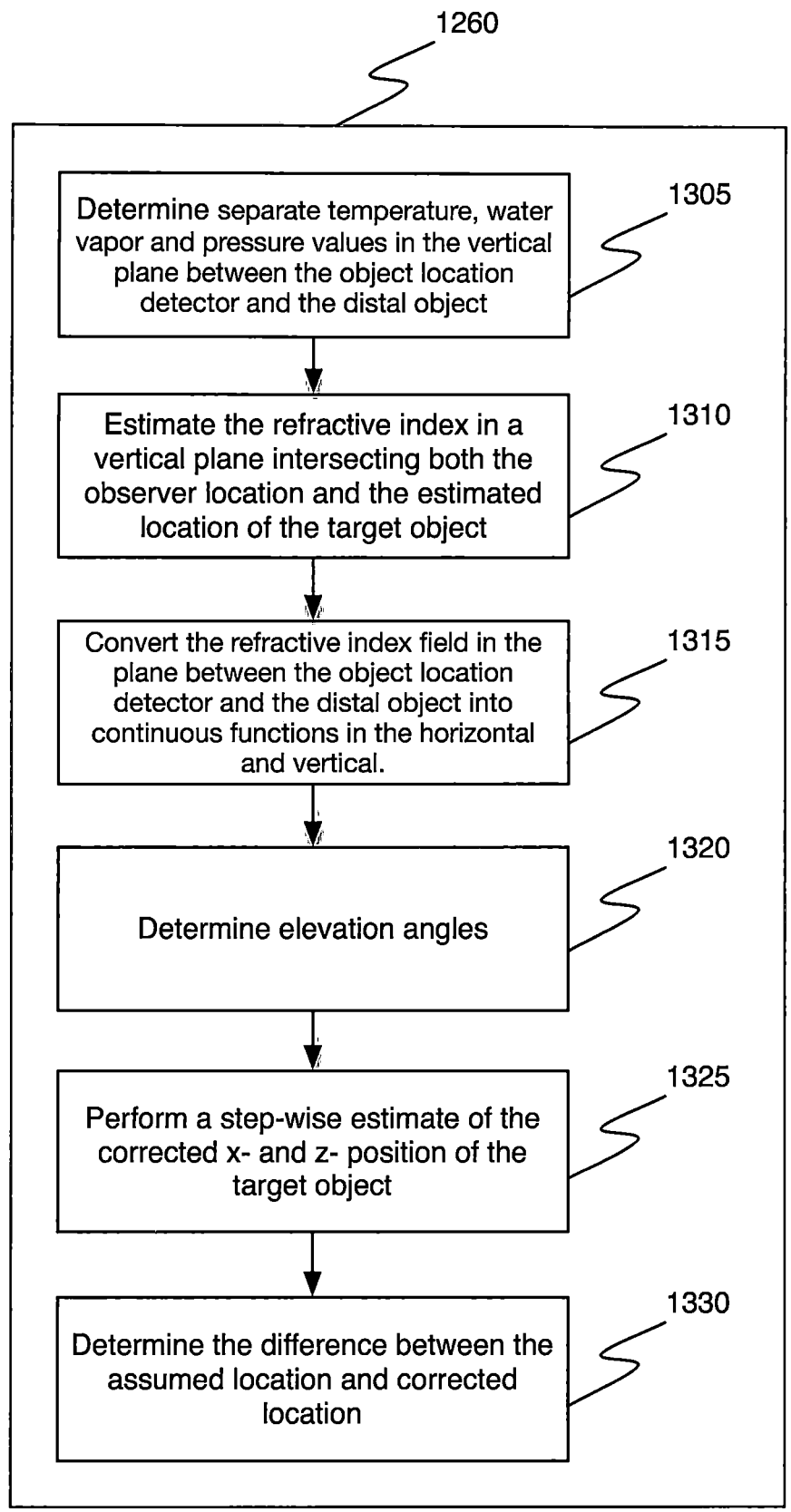
FIG. 13 is a flow diagram of the correction process of the object location correction engine of FIG. 10.

Referring now to FIG. 13, in some embodiments, the determination of the correction factors that quantify the difference between the assumed location and the corrected location of the distal object begins with extracting weather data in the 2-dimensional horizontal/vertical plane between object location detector and the distal object 1305. These weather values are then used by a computing device to compute the index of refraction at the appropriate wavelength for the object location detector in that same 2-dimensional plane 1310. This index of refraction field is then expressed as a continuous function using a bivariate spline function 1315. The calculate_elevation_angles function can use the horizontal distance between the object location detector and the distal object, as well as the assumed altitude of the distal object to estimate the elevation angle of the object location detector 1320. The calculate_optical_raypath function can use a stepwise process to estimate the propagation of a light wave from the object location detector to the distal object 1325. The difference between where that ray path ends when it reaches the assumed distance to the distal object and the assumed location of the distal object is returned as the value of the correction and the endpoint of the ray path is the corrected location 1330.

Figure 14:
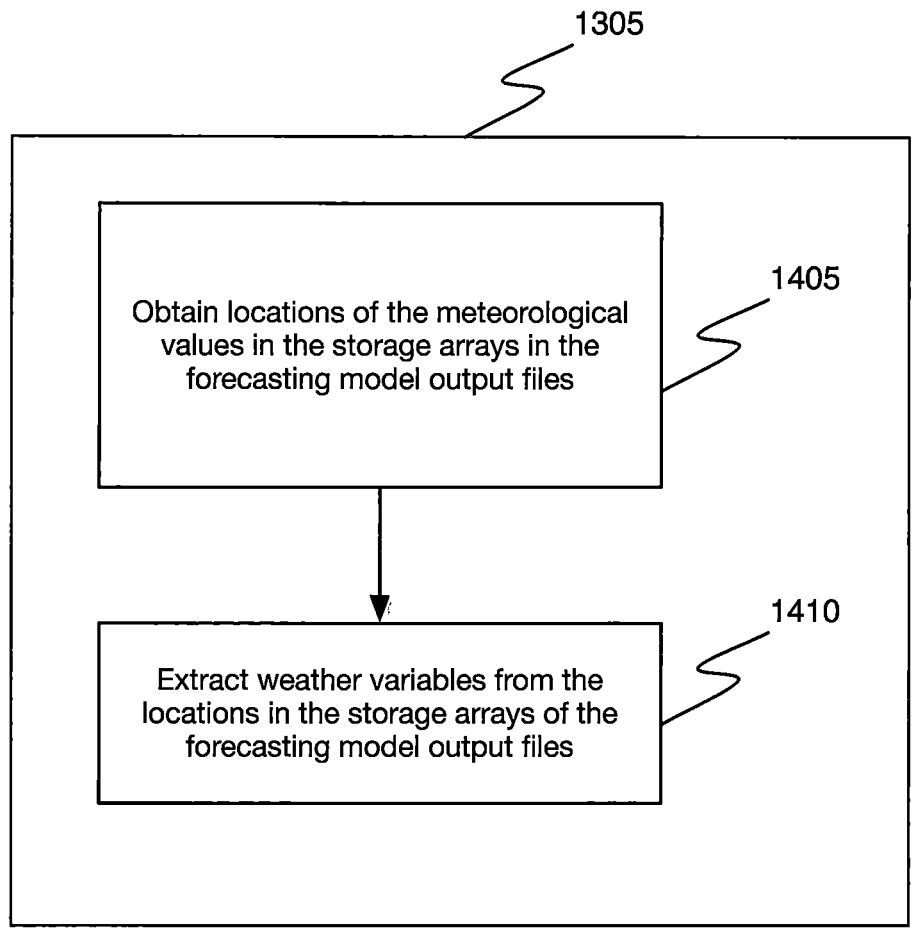
FIG. 14 is a flow diagram of the object location correction engine of FIG. 10 determining separate temperature, water vapor and pressure values in the vertical plane between the object location detector and the distal object.
Figure 15:
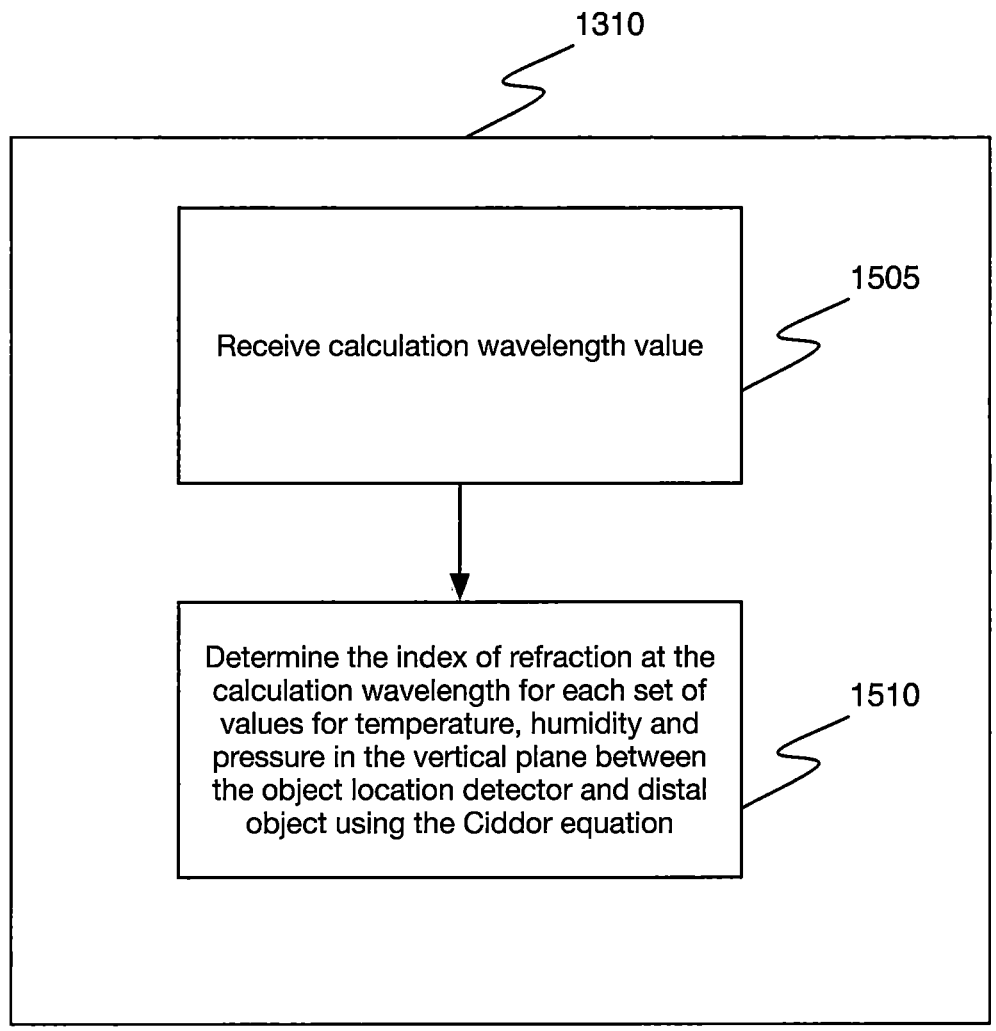
FIG. 15 is a flow diagram is a flow diagram of the object location correction engine of FIG. 10 estimating the refractive index in a vertical plane intersecting both the observer location and the estimated location of the distal object.

Referring now to FIG. 14 and FIG. 15, in some embodiments, the temperature, humidity, and pressure values are extracted from numerical weather forecasting model output files, such as the WRF model output files, using, for example, the getvar routine of the WRF Python library. The locations of the object location detector and distal object can be used to define a 2-dimensional plane in the weather model output field. The vertcross function in the WRF python library can extract the temperature, humidity, and pressure values from the WRF data for just the 2-dimensional plane 1405, 1410. In some instances, latitude and longitude locations of the distal object location detector and the distal object can be used in combination with WRF python tools to obtain locations of the meteorological values in the storage arrays for these quantities in the WRF output files.

The ref_index compute operation determines the refractive index of air by taking as inputs one or more of the desired wavelength 1505, air temperature, pressure, water vapor concentration, and CO2 concentration, returning a phase index, that is the ratio of the phase speed of light in a vacuum to the phase speed of light in the air.

In some embodiments, the ref_index compute operation further extracts the vertical cross sections of temperature, air pressure, and relative humidity for a 2-D vertical plane in the atmosphere from a numerical weather forecasting model output, such as WRF output 1510. In some instances, this process determines the cross-section of refractive index from the numerical weather forecasting model meteorological variables. The 2-D plane can be defined by specifying the origin site and a distal object site by latitude/longitude coordinates.

In some embodiments, a calculate_refractive_index compute operation calculates a 2-D cross-section of index of refraction in the atmosphere. This process can utilize the vertcross function in the wrf-python open-source library to extract the cross-sections of the meteorological variables from WRF output files and then calculate the refractive index via the ciddor_ri function in the ref_index.py code file;

In some embodiments the determination of the elevation angle of the object location detector is based on the estimate distal object altitude, surface altitude under the estimated distal object location, and the distance between the object location detector location and the estimated distal object location. Elevation angle is then determined from the arctangent of horizontal and vertical distances.

Figure 16:
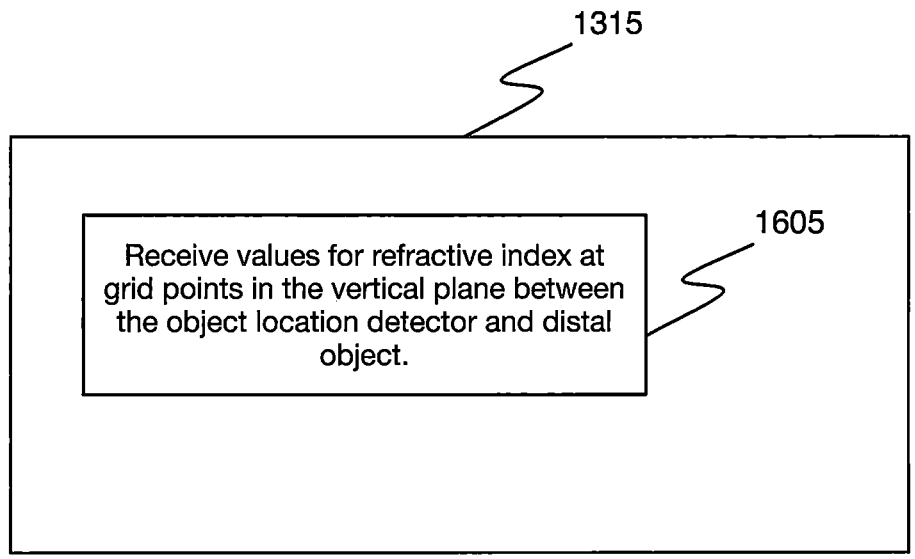
FIG. 16 is a flow diagram of the object location correction engine of FIG. 10 converting the refractive index field in the plane between the object location detector and the distal object into continuous functions in the horizontal and vertical.

Referring now to FIG. 16 in some embodiments, the discrete gridded field of the index of refraction in the horizontal/vertical plane between the object location detector and the distal object is converted to a continuous function using a calculate_ri_spline process that fits a bivariate spline to each refractive index vertical cross section 1605.

Figure 17:
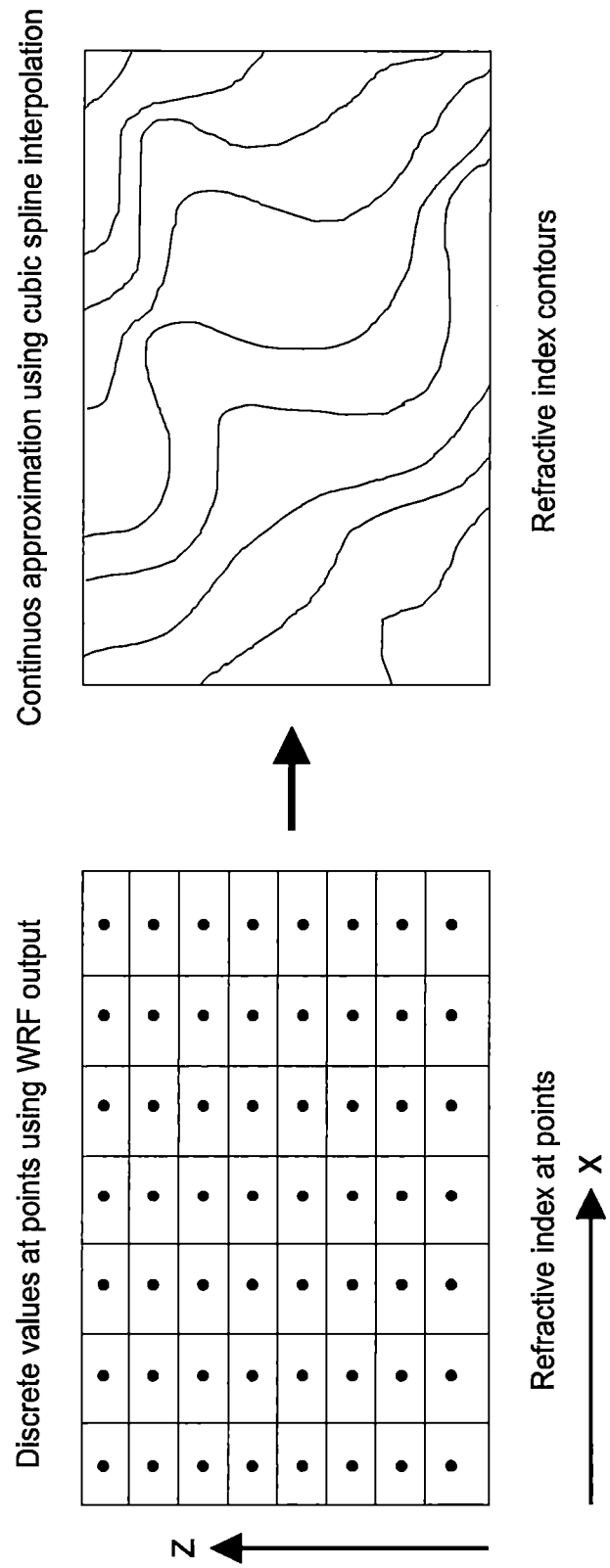
FIG. 17 is a graphical representation of the spline engine of FIG. 11 approximating a refractive index field in a vertical cross-section.

Referring now to FIG. 17 a schematic of the transformation of a discrete gridded 2-dimensional field into a 2-dimensional continuous representation of the same quantity is disclosed 1700. This spline creates a continuous function that can be used to calculate horizontal and vertical derivatives of the refractive index.

Figure 18:
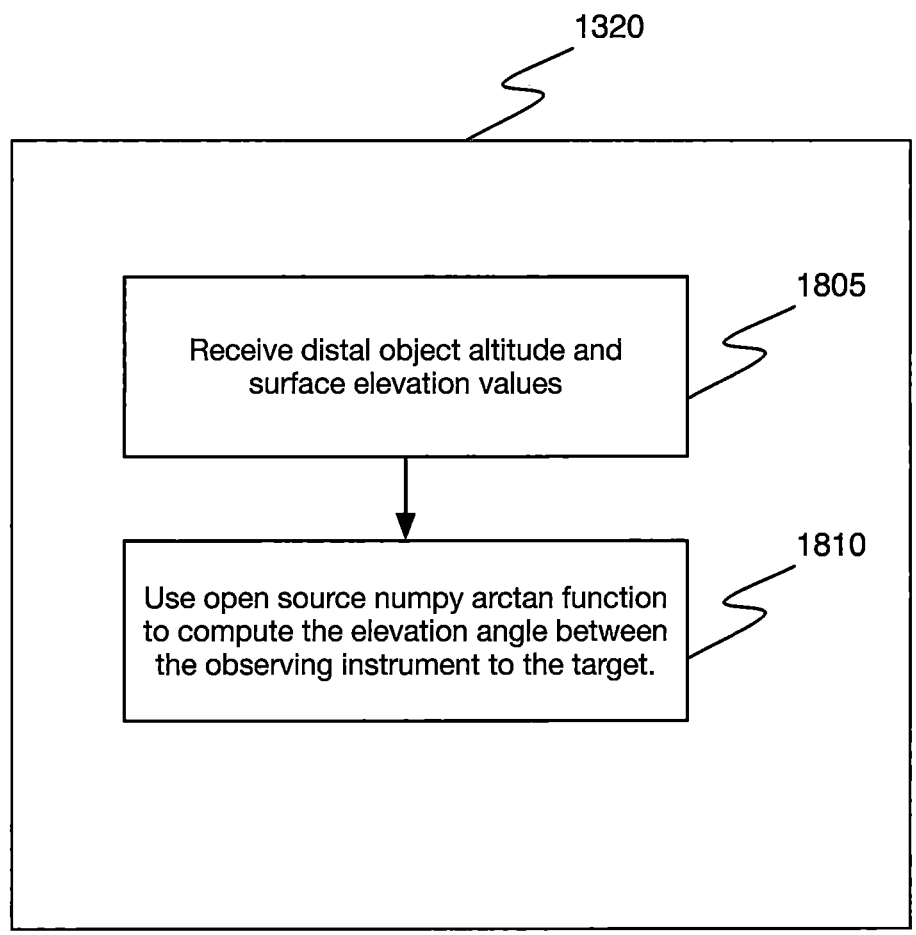
FIG. 18 is a flow diagram of the object location correction engine of FIG. 10 determining elevation angles.

Referring now to FIG. 18, in some embodiments, a calculate_elevation_angles process calculates the elevation angle between site and distal object. The process first receives distal object altitude and distal object surface elevation values 1805. The process then can use, for example, the open source numpy arctan function to compute the elevation angle between the object location detector to the distal object.

Figure 19:
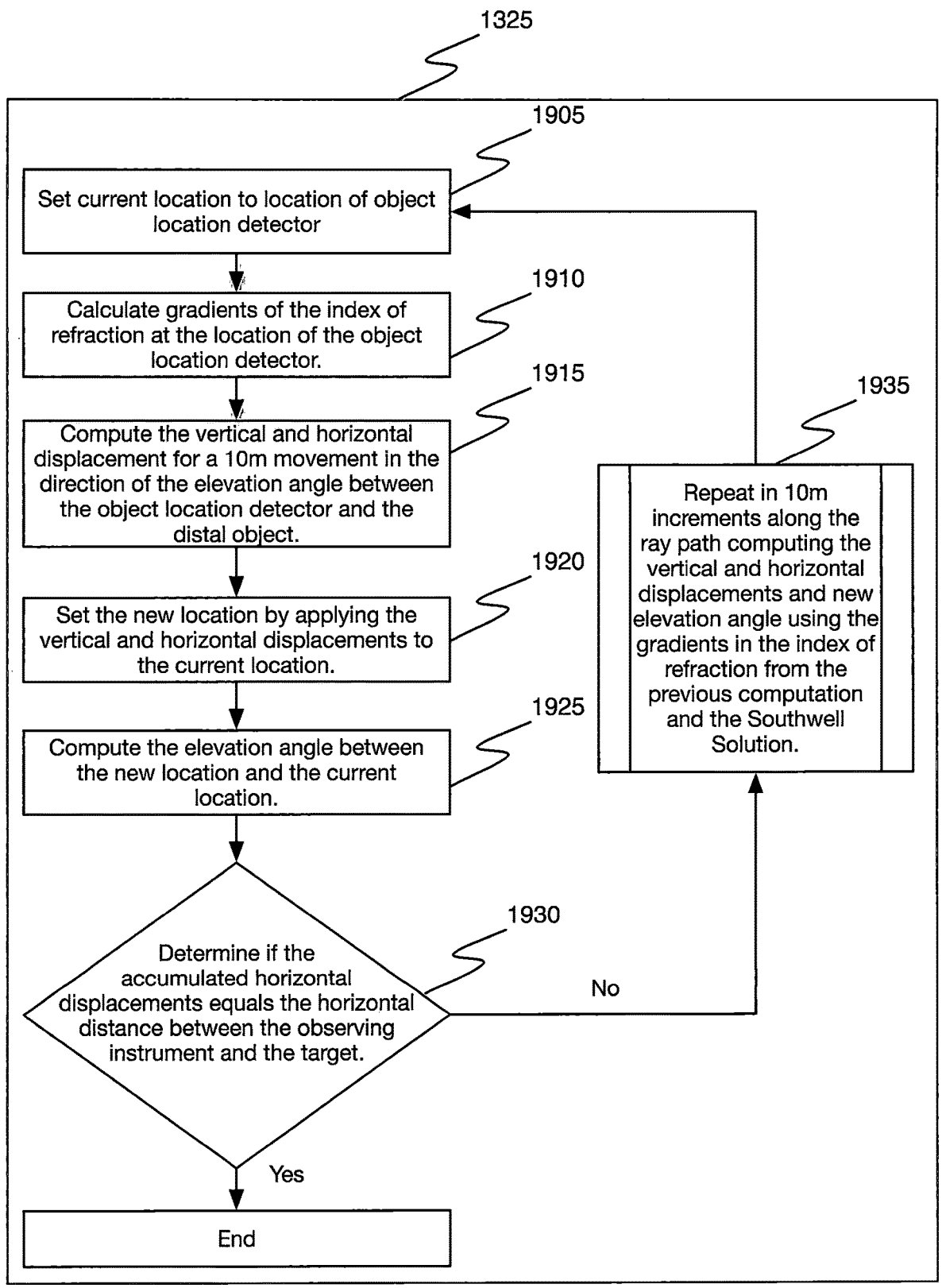
FIG. 19 is a flow diagram of the object location correction engine of FIG. 10 step-wise estimating the corrected x- and z-position of the distal object.

Referring now to FIG. 19 in some embodiments, the calculate_optical_raypath process determines the trajectory of a ray path along the 2-D plane from the origin site to an object above the surface at the distal object location. In some instances, the ray path determination begins at the origin site at the surface and initially propagates at an elevation angle consistent with an observer at the origin site observing an object at the assumed altitude over the distal object site. The process can then propagate that ray through the 2-D plane toward the distal object, accounting for bending in the ray path due to refraction through the cross-section of varying refractive index. In some instances, a consequence of the bending of the ray is that when the ray reaches the distal object location, it is at a different altitude than the assumed altitude consistent with the viewing angle of the observer at the origin location. The process provides the altitude of the ray path at the distal object location as the corrected_altitude.

In some embodiments, the calculate_optical_raypath process determines the bending of the ray path using, for example, an equation for the propagation of a ray in a continuous medium of varying refractive index such as the Southwell Solution. This differential equation, which is dependent on the gradient of the index of refraction along the ray path, is integrated numerically forward in 2-D space in small increments of vertical propagation of the ray. In some embodiments, the integration is performed using a simple first-order finite differencing scheme. The increment of vertical propagation is an input to the calculate_optical_raypath process and can be varied. In some embodiments, the finite difference scheme is replaced with an alternate scheme, such as a second-order centered differencing scheme. In some instances, experiments varying the vertical increment of integration and the accuracy of the finite differencing can be performed to characterize the accuracy of the algorithm.

The computation of the ray path from the object location detector to the distal object can be accomplished by a stepwise solution of the differential equation describing the propagation through a continuous medium with varying index of refraction, such as, for example, the Southwell Solution. Starting at the object location detector location 1905, the local gradients of the index of refraction are computed in the horizontal and vertical directions 1910. Then the vertical displacements in the horizontal and vertical directions are computed by applying the horizontal and vertical gradients of the index of refraction in the Southwell Solution. In some embodiments, the gradients and displacements are computed for 10 m increments along the ray path 1915. The location of the computation is then set to the new location based on the horizontal and vertical displacements previously computed 1920. The new elevation angle is computed between the current location along the ray path and the assumed location of the distal object 1925. These steps, beginning with the computation of the local gradients of the index of refraction on a computing device is repeated in increments along the ray path until the horizontal distance traveled along the ray path is equal to the estimated horizontal distance between the object location detector and the estimated location of the distal object 1930, 1935.

In some embodiments, an evaluation of corrected location of the distal object is made following the stepwise computation displacements and elevation angles along the ray path from object location detector toward the estimated location of the distal object. The difference in the altitude of the accumulated vertical displacements along the ray path and the assumed altitude of the distal object is the magnitude of the correction to the estimated distal object altitude. If above sea level is used, then there is no correction for terrain elevation. If above ground level is used, then there can be a correction for terrain elevation by subtraction. In some instances the corrected altitude may be reported as above mean sea level, in other instances the corrected altitude may be reported as above ground level, and in certain other instances the corrected altitude may be reported using some other reference datum. In some instances, such as when using radar, a real-time processor provides an initial estimate of one or more of bearing, azimuth, and altitude, which can be calculated from azimuth and range, allowing for the generation of a corrected position in real-time.

Many different systems can implement the atmospheric optical distortion correcting method. Moreover, the steps of the present method could occur at different parts of a system, at a single part of a system, in parallel across the system, or in any other fashion. Moreover, certain embodiments of the atmospheric optical distortion correcting system and method are described with reference to methods, apparatus (systems) and computer program products that can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the acts specified herein to transform data from a first state to a second state.

These computer program instructions can be stored in a computer-readable memory that can direct a computer or other programmable data processing apparatus to operate in a particular manner, such that the instructions stored in the computer-readable memory produce an article of manufacture including instruction that implement the acts specified herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified herein.

The various illustrative logical blocks, modules, circuits, and algorithm steps described in connection with the embodiments disclosed herein can be implemented as electronic hardware, computer software, or combinations of both. The various illustrative logical blocks, modules, and circuits described in connection with the embodiments disclosed herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, (e.g., a combination of a DSP and a microprocessor), a plurality of microprocessors, one or more microprocessors in conjunction with a DSP core, or any other such configuration.

The blocks of the methods and algorithms described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a solid-state drive, a hard disk drive, a removable disk, a CD-ROM, or any other form of computer-readable storage medium known in the art. An exemplary storage medium is coupled to one or more processors such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Figure 20:
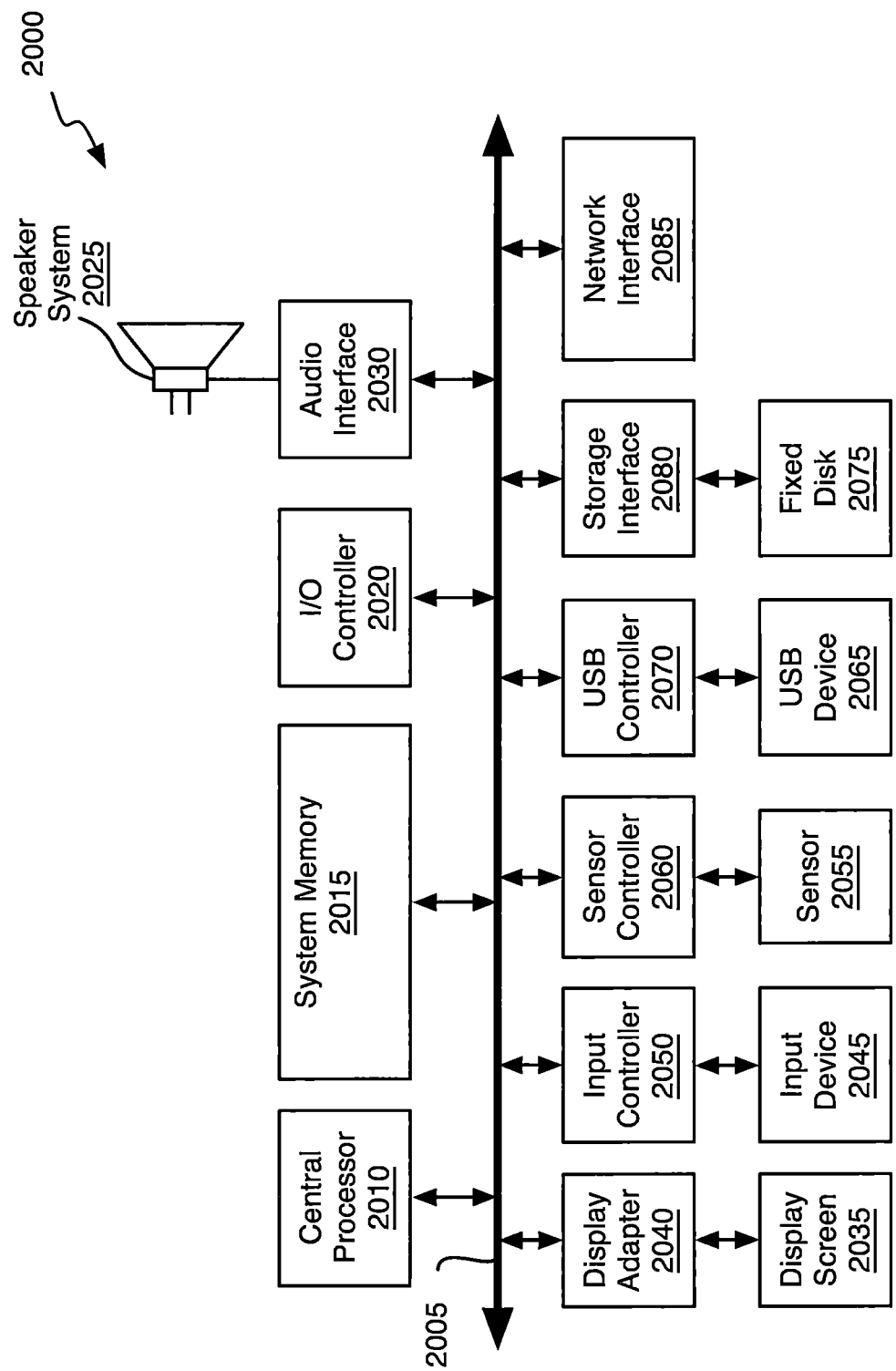
FIG. 20 is a is a block diagram of a computing system suitable for implementing the operations of the atmospheric optical distortion correcting system and method as part of FIG. 3.

Referring now to FIG. 20, in one configuration, the atmospheric optical distortion correcting system devices 2000 include a bus 2005 which interconnects major subsystems of computing device, 112, such as a central processor 2010, a system memory 2015 (typically RAM, but which may also include ROM, flash RAM, or the like), an input/output controller 2020, an external audio device, such as a speaker system 2025 via an audio output interface 2030, an external device, such as a display screen 2035 via display adapter 2040, an input device 2045 (e.g., remote control device interfaced with an input controller 2050), one or more USB devices 2065 (interfaced with a USB controller 2070), and a storage interface 2080. In some instances, the computing device 112 includes one or more sensors 2055 connected to bus 2005 through a sensor controller 2060 and a network interface 2085 (coupled directly to bus 2005).

Bus 2005 allows data communication between central processor 2010 and system memory 2015, which may include read-only memory (ROM) or flash memory (neither shown), and random access memory (RAM) (not shown), as previously noted. The RAM is generally the main memory into which the operating system and logic instructions are loaded. The ROM or flash memory may contain, among other code, the Basic Input-Output system (BIOS) which controls basic hardware operation such as the interaction with peripheral components or devices. Instructions resident with the atmospheric optical distortion correcting system computing devices are generally stored on and accessed via a non-transitory computer readable medium, such as a solid-state drive (e.g., fixed disk 2075), a hard disk drive, or other storage medium. Additionally, applications may be in the form of electronic signals modulated in accordance with the application and data communication technology when accessed via interface 2085.

Storage interface 2080, as with the other storage interfaces of computing device 2000, may connect to a standard computer readable medium for storage and/or retrieval of information, such as a fixed disk drive 2075. Fixed disk drive 2075 may be a part of computing device 2000 or may be separate and accessed through other interface systems. Network interface 2085 may provide a direct connection to a remote server computing device via a direct network link to the Internet. Network interface 2085 may provide such connection using wireless techniques, including broadband, digital cellular telephone connection, Cellular Digital Packet Data (CDPD) connection, digital satellite data connection, or the like. In some embodiments, one or more sensors connect to computing device 2000 wirelessly via network interface 2085.

Many other devices or subsystems (not shown) may be connected in a similar manner. Conversely, all of the devices shown in FIG. 20 need not be present to practice the present systems and methods. The devices and subsystems may be interconnected in different ways from that shown in FIG. 20. The aspect of some operations of a system such as that shown in FIG. 20 are readily known in the art and are not discussed in detail in this application. Computer instructions to implement the present disclosure may be stored in a non-transitory computer-readable medium such as one or more of system memory 2015 or fixed disk 2075. The operating system provided on computing device 2000 may be, for example, iOS, ANDROID, MS-WINDOWS, UNIX, LINUX, OSX, or another known operating system.

In practice, the calculation techniques involved to adjust a given real-world ray cannot practically be performed solely in the human mind. In practice, a typical target will be at least 1,500 feet away and often more to far more feet away. In practice, the number of calculations of discrete path adjustments based on indicia_of correction per volume of atmosphere would practically range from at least 10 to 500 to 1,000 to 1,000,000 and even far more per second. Even for such calculations that may even somehow be as low as 10 per second, the human mind would not be capable of such rapid calculations needed for a real world system. It is to be understood therefore that the ranges of such ray adjustment calculations contemplated herein are from 10-1,000,000 per second and all ranges of calculations between 10 and 1,000,000 and time periods between 0.001 and 1 second. The number of calculations per time unit can increase as computing capability increases of course.

Clause 1. An automated electromagnetic radiation target location correction method comprising in combination: with a locator system, electromagnetically identifying a preliminary distal target location as being along an electromagnetic ray path through atmosphere intermediate a locator device and a distal target distal from the locator device; with an automated computing system: calculating 1 to n indices of refraction in 1 to n differing discrete portions, respectively, along the electromagnetic ray path, wherein n is an integer greater that 1; for each discrete ray path portion, computing an adjusted ray path due to an index of electromagnetic refraction associated with the discrete ray path portion; computing a modified electromagnetic ray path including each discrete ray path's associated adjusted ray path; computing the adjusted target location according to the modified electromagnetic ray path; and communicating the adjusted target location to the locator system in support of path correction by the locator system.

Clause 2. The automated electromagnetic radiation target location method of clause 1 wherein the calculating step calculates each index of refraction, for an associated discrete ray path portion, among a plurality of the indices of refraction from a weather model simulation for said associated discrete ray path portion.

Clause 3. The automated electromagnetic radiation target location method of clause 2 where the calculation of each index of refraction from a weather model simulation for said associated discrete ray portion is based on input of temperature, humidity, and pressure from the weather model simulation associated with said associated discrete ray path.

Clause 4. The automated electromagnetic radiation target location method of clause 3 wherein the calculation of each index of refraction is also based on a wavelength of interest as input.

Clause 5. The automated electromagnetic radiation target location method of clause 4 wherein the calculation of each index of refraction is also based on at least one other chemical or physical aspect associated with said discrete ray path as input.

Clause 6. The automated electromagnetic radiation target location method of clause 1 wherein the locator system determines electromagnetic target location based on input from multiple, spaced-apart target location locating components.

Clause 7. The automated electromagnetic radiation target location method of clause 3 wherein the locator system determines electromagnetic target location based on input from multiple, space-apart target locating components.

Clause 8. The automated electromagnetic radiation target location method of clause 5 wherein the locator system determines electromagnetic radiation target location based on input from multiple, space-apart target locating components.

Clause 9. The automated electromagnetic radiation target location method of clause 1 wherein n exceeds 100 and computes a complete adjusted ray path in real time.

Clause 10. The automated electromagnetic radiation target location method of clause 1 wherein n exceeds 500 and computes a complete adjusted ray path in real time.

Clause 11. The automated electromagnetic radiation target location method of clause 3 wherein n exceeds 500 and computes a complete adjusted ray path in real time.

Clause 12. The automated electromagnetic radiation target location method of clause 8 wherein n exceeds 500 and computes a complete adjusted ray path in real time.

Clause 13. The automated electromagnetic radiation target location method of clause 2 wherein at least a transmitted portion the weather model simulation is received by the automated computing system and includes an atmosphere data volume inclusive of the locator device and the distal target location.

Clause 14. The automated electromagnetic radiation target location method of clause 3 wherein at least a transmitted portion the weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

Clause 15. The automated electromagnetic radiation target location method of clause 6 wherein at least a transmitted portion of a weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

Clause 16. The automated electromagnetic radiation target location method of clause 9 wherein at least a transmitted portion of a weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

Clause 17. The automated electromagnetic radiation target location method of clause 12 wherein at least a transmitted portion the weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

Clause 18. The automated electromagnetic radiation target location method of clause 13 wherein the atmosphere data in the atmosphere data volume varies in three spatial dimensions and time.

Clause 19. The automated electromagnetic radiation target location method of clause 12 wherein an atmosphere data in an atmosphere data volume varies in three spatial dimensions and time.

Clause 20. The automated electromagnetic radiation target location method of clause 1 wherein the locator device is one or more of land-based, water-based, or air-based.

Terms of orientation used herein, such as "top," "bottom," "proximal," "distal," "longitudinal," "lateral," and "end," are used in the context of the illustrated implementation. However, the present disclosure should not be limited to the illustrated orientation. Indeed, other orientations are possible and are within the scope of this disclosure.

Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain implementations include or do not include, certain features, elements, and/or steps. Thus, such conditional language is not generally intended to imply that features, elements, and/or steps are in any way required for one or more implementations.

Conjunctive language, such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

The terms "approximately," "about," and "substantially" as used herein represent an amount close to the stated amount that still performs a desired function or achieves a desired result. For example, in some implementations, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain implementations, as the context may dictate, the term "generally parallel" can refer to something that departs from exactly parallel by less than or equal to 20 degrees.

Unless otherwise noted, the terms "a" or "an," as used in the specification are to be construed as meaning "at least one of." In addition, for ease of use, the words "including" and "having," as used in the specification, are interchangeable with and have the same meaning as the word "comprising." In addition, the term "based on" as used in the specification is to be construed as meaning "based at least upon."

Several illustrative implementations of atmospheric optical distortion correcting system and metho] have been disclosed. Although this disclosure has been described in terms of certain illustrative implementations and uses, other implementations and other uses, including implementations and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various implementations. All possible combinations and subcombinations of elements and components described herein are intended to be included in this disclosure. No single feature or group of features is necessary or indispensable.

Certain features that are described in this disclosure in the context of separate embodiments can also be implemented in combination in a single embodiment. Conversely, various features that are described in the context of a single implementation also can be implemented in multiple embodiments separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one implementation or example in this disclosure can be combined or used with (or instead of) any other portion of any of the steps, processes, structures, and/or devices disclosed or illustrated in a different implementation, flowchart, or example. The implementations and examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative embodiments have been described, any implementations having equivalent elements, modifications, omissions, and/or combinations are also within the scope of this disclosure. Moreover, although certain aspects, advantages, and novel features are described herein, not necessarily all such advantages may be achieved in accordance with any particular implementation. For example, some implementations within the scope of this disclosure achieve one advantage, or a group of advantages, as taught herein without necessarily achieving other advantages taught or suggested herein. Further, some implementations may achieve different advantages than those taught or suggested herein.

Some implementations have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various implementations can be used in all other implementations set forth herein. Additionally, any methods described herein may be practiced using any device suitable for performing the recited steps.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

In places where the description above refers to particular implementations of an atmospheric optical distortion correcting system and method, it should be readily apparent that a number of modifications may be made without departing from the spirit thereof and that these implementations may be applied to other atmospheric optical distortion correcting systems. It will be understood that implementations are not limited to the specific components disclosed herein, as virtually any components consistent with the intended operation of an atmospheric optical distortion correcting system and method may be utilized. Components may comprise any shape, size, style, type, model, version, class, grade, measurement, material, weight, quantity, and/or the like consistent with the intended operation of a method and/or system implementation for an atmospheric optical distortion correcting system and method.

What is claimed is:

1. An automated electromagnetic radiation target location correction method comprising in combination:
    with a locator system, electromagnetically identifying a preliminary distal target location as being along an electromagnetic ray path through atmosphere intermediate a locator device and a distal target distal from the locator device;
    with an automated computing system:
        calculating 1 to n indices of refraction in 1 to n differing discrete ray path portions from a weather model simulation for each said associated discrete ray path portion, respectively, along the electromagnetic ray path, wherein n is an integer greater than 1;
        for each discrete ray path portion, computing an adjusted ray path due to the calculated index of electromagnetic refraction associated with the discrete ray path portion;
        computing a modified electromagnetic ray path including each discrete ray path's associated adjusted ray path;
        computing the adjusted target location according to the modified electromagnetic ray path; and
        communicating the adjusted target location to the locator system in support of path correction by the locator system.

2. The automated electromagnetic radiation target location method of claim 1 where the calculation of each index of refraction from a weather model simulation for said associated discrete ray portion is based on input of temperature, humidity, and pressure from the weather model simulation associated with said associated discrete ray path.

3. The automated electromagnetic radiation target location method of claim 2 wherein the calculation of each index of refraction is also based on a wavelength of interest as input.

4. The automated electromagnetic radiation target location method of claim 3 wherein the calculation of each index of refraction is also based on at least one other chemical or physical aspect associated with said discrete ray path as input.

5. The automated electromagnetic radiation target location method of claim 4, wherein the locator system determines electromagnetic radiation target location based on input from multiple, space-apart target locating components.

6. The automated electromagnetic radiation target location method of claim 5 wherein n exceeds 500 and computes a complete adjusted ray path in real time.

7. The automated electromagnetic radiation target location method of claim 6 wherein at least a transmitted portion the weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

8. The automated electromagnetic radiation target location method of claim 6 wherein an atmosphere data in an atmosphere data volume varies in three spatial dimensions and time.

9. The automated electromagnetic radiation target location method of claim 2 wherein the locator system determines electromagnetic target location based on input from multiple, space-apart target locating components.

10. The automated electromagnetic radiation target location method of claim 2 wherein n exceeds 500 and computes a complete adjusted ray path in real time.

11. The automated electromagnetic radiation target location method of claim 2 wherein at least a transmitted portion the weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

12. The automated electromagnetic radiation target location method of claim 1 wherein the locator system determines electromagnetic target location based on input from multiple, spaced-apart target location locating components.

13. The automated electromagnetic radiation target location method of claim 12 wherein at least a transmitted portion of a weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

14. The automated electromagnetic radiation target location method of claim 1 wherein n exceeds 100 and computes a complete adjusted ray path in real time.

15. The automated electromagnetic radiation target location method of claim 14 wherein at least a transmitted portion of a weather model simulation is received by the automated computing system and includes an atmosphere data volume inclusive of the locator device and the distal target location, the atmosphere data volume including a plurality of discrete data ray path portion, with each discrete data ray portion including temperature data, humidity data, and pressure data.

16. The automated electromagnetic radiation target location method of claim 1 wherein n exceeds 500 and computes a complete adjusted ray path in real time.

17. The automated electromagnetic radiation target location method of claim 1 wherein at least a transmitted portion the weather model simulation is received by the automated computing system and includes an atmosphere data volume inclusive of the locator device and the distal target location.

18. The automated electromagnetic radiation target location method of claim 17 wherein the weather model simulation.

19. The automated electromagnetic radiation target location method of claim 1 wherein the locator device is one or more of land-based, water-based, or air-based.

20. The automated electromagnetic radiation target location method of claim 1 wherein the method can be performed without necessarily assessing, procuring, or receiving a global positioning system signal.

21. The automated electromagnetic radiation target location method of claim 1 wherein the weather model simulation is a third party weather model simulation.

* * * * *